(12) United States Patent
Zhu et al.

(10) Patent No.: US 11,042,590 B2
(45) Date of Patent: Jun. 22, 2021

(54) METHODS, SYSTEMS AND TECHNIQUES FOR PERSONALIZED SEARCH QUERY SUGGESTIONS

(71) Applicant: Yahoo Holdings, Inc., Sunnyvale, CA (US)

(72) Inventors: Shenhong Zhu, Santa Clara, CA (US); Chun Ming Sze, Fremont, CA (US); Hang Su, Vienna, VA (US); Huming Wu, San Jose, CA (US); Hui Wu, Sunnyvale, CA (US); Jiuhe Gan, Cupertino, CA (US); Xiaobing Han, San Jose, CA (US); Mingtian Liu, San Jose, CA (US); Yuan Zhang, Milpitas, CA (US); Scott Gaffney, Palo Alto, CA (US)

(73) Assignee: Verizon Media Inc., New York, NY (US)

( * ) Notice: Subject to any disclaimer, the term of this patent is extended or adjusted under 35 U.S.C. 154(b) by 262 days.

(21) Appl. No.: 14/875,034

(22) Filed: Oct. 5, 2015

(65) Prior Publication Data
US 2017/0097939 A1    Apr. 6, 2017

(51) Int. Cl.
*G06F 16/9032*    (2019.01)
*G06F 16/9535*    (2019.01)

(52) U.S. Cl.
CPC .... *G06F 16/90324* (2019.01); *G06F 16/9535* (2019.01)

(58) Field of Classification Search
CPC ............... G06F 16/90324; G06F 16/9535
USPC ............................................. 707/769
See application file for complete search history.

(56) References Cited

U.S. PATENT DOCUMENTS

| | | | |
|---|---|---|---|
| 2009/0112848 A1* | 4/2009 | Kunjithapatham | G06F 16/738 |
| 2009/0132644 A1* | 5/2009 | Frishert | G06F 16/9537 709/203 |
| 2011/0082848 A1* | 4/2011 | Goldentouch | G06F 17/30867 707/706 |
| 2011/0307498 A1 | 12/2011 | McFarlane et al. | |
| 2013/0054631 A1 | 2/2013 | Govani et al. | |
| 2013/0290110 A1* | 10/2013 | LuVogt | G06Q 30/02 705/14.66 |
| 2015/0347593 A1 | 12/2015 | Tsai et al. | |
| 2016/0078086 A1* | 3/2016 | Nowak-Przygodzki | G06F 17/30448 707/723 |
| 2017/0024375 A1 | 1/2017 | Hakkani-Tur et al. | |

OTHER PUBLICATIONS

Office Action dated Jan. 12, 2018 in U.S. Appl. No. 14/874,996.
Office Action dated Jul. 27, 2018 in U.S. Appl. No. 14/874,996.
Office Action dated Jul. 31, 2018 in U.S. Appl. No. 14/875,072.

(Continued)

*Primary Examiner* — Evan Aspinwall
(74) *Attorney, Agent, or Firm* — Pillsbury Winthrop Shaw Pittman LLP

(57) ABSTRACT

The present teaching, which includes methods, systems and computer-readable media, relates to providing query suggestions based on multiple data sources including at least person's personal data. The disclosed techniques may include receiving an input from a person, obtaining one or more suggestions based on a person corpus derived from at least one data source private to the person, and presenting at least the one or more suggestions.

22 Claims, 29 Drawing Sheets

(56) References Cited

OTHER PUBLICATIONS

Office Action dated Feb. 8, 2019 in U.S. Appl. No. 14/875,072.
Office Action dated Feb. 8, 2019 in U.S. Appl. No. 14/874,996.
Office Action dated Aug. 22, 2019 in U.S. Appl. No. 14/874,996.
Office Action dated Aug. 22, 2019 in U.S. Appl. No. 14/875,072.
Office Action dated Apr. 30, 2020 in U.S. Appl. No. 14/874,996.
Office Action dated May 6, 2020 in U.S. Appl. No. 14/875,072.
Office Action dated Nov. 16, 2020 in U.S. Appl. No. 14/874,996.
Office Action dated Dec. 7, 2020 in U.S. Appl. No. 14/875,072.
Office Action dated Apr. 28, 2021 in U.S. Appl. No. 14/875,072.

* cited by examiner

METHODS, SYSTEMS AND TECHNIQUES FOR PERSONALIZED SEARCH QUERY SUGGESTIONS

CROSS-REFERENCE TO RELATED APPLICATIONS

The present application is related to U.S. patent application Ser. No. 14/874,996, filed on the same date, Oct. 5, 2015, entitled METHODS, SYSTEMS AND TECHNIQUES FOR PROVIDING SEARCH QUERY SUGGESTIONS BASED ON NON-PERSONAL DATA AND USER PERSONAL DATA ACCORDING TO AVAILABILITY OF USER PERSONAL DATA, and U.S. patent application Ser. No. 14/875,072, filed on the same date, Oct. 5, 2015, entitled METHODS, SYSTEMS AND TECHNIQUES FOR RANKING PERSONALIZED AND GENERIC SEARCH QUERY SUGGESTIONS, both of which are incorporated herein by reference in their entireties.

BACKGROUND

1. Technical Field

The present teaching generally relates to organizing, retrieving, and providing information. Specifically, the present teaching relates to methods, systems and techniques for providing search query suggestions, and more specifically, to providing search query suggestions to a person based on a number of data sources including person's personal data and non-personal data.

2. Discussion of Technical Background

The Internet has made it possible for a person to electronically access virtually any content at any time and from any location. The Internet technology facilitates information publishing, information sharing, and data exchange in various spaces and among different persons. One problem associated with the rapid growth of the Internet is the so-called "information explosion," which is the rapid increase in the amount of available information and the effects of this abundance. As the amount of available information grows, the problem of managing the information becomes more difficult, which can lead to information overload. With the explosion of information, it has become more and more important to provide users with information from a public space that is relevant to the individual person and not just information in general.

In addition to the public space such as the Internet, semi-private spaces including social media and data sharing sites have become another important source where people can obtain and share information in their daily lives. The continuous and rapid growth of social media and data sharing sites in the past decade has significantly impacted the lifestyles of many; people spend more and more time on chatting and sharing information with their social connections in the semi-private spaces or use such semi-private sources as additional means for obtaining information and entertainment. Similar to what has happened in the public space, information explosion has also become an issue in the social media space, especially in managing and retrieving information in an efficient and organized manner.

Private space is another data source used frequently in people's everyday lives. For example, personal emails in Yahoo! mail, Gmail, Outlook etc. and personal calendar events are considered as private sources because they are only accessible to a person when she or he logs in using private credentials. Although most information in a person's private space may be relevant to the person, it is organized in a segregated manner. For example, a person's emails may be organized by different email accounts and stored locally in different email applications or remotely at different email servers. As such, to get a full picture of some situation related to, e.g., some event, a person often has to search different private spaces to piece everything together. For example, to check with a friend of the actual arrival time for a dinner, one may have to first check a particular email (in the email space) from the friend indicating the time the friend will arrive, and then go to Contacts (a different private space) to search for the friend's contact information before making a call to the friend to confirm the actual arrival time. This is not convenient.

The segregation of information occurs not only in the private space, but also in the semi-private and public spaces. This has led to another consequential problem given the information explosion: requiring one to constantly look for information across different segregated spaces to piece everything together due to lack of meaningful connections among pieces of information that are related in actuality yet isolated in different segregated spaces.

Efforts have been made to organize the huge amount of available information to assist a person to find the relevant information. Conventional scheme of such effort is application-centric and/or domain-centric. Each application carves out its own subset of information in a manner that is specific to the application and/or specific to a vertical or domain. For example, such attempt is either dedicated to a particular email account (e.g., www.Gmail.com) or specific to an email vertical (e.g., Outlook); a traditional web topical portal allows users to access information in a specific vertical, such as www.IMDB.com in the movies domain and www.ESPN.com in the sports domain. In practice, however, a person often has to go back and forth between different applications, sometimes across different spaces, in order to complete a task because of the segregated and unorganized nature of information existing in various spaces. Moreover, even within a specific vertical, the enormous amount of information makes it tedious and time consuming to find the desired information.

Another line of effort is directed to organizing and providing information in an interest-centric manner. For example, user groups of social media in a semi-private space may be formed by common interests among the group members so that they can share information that is likely to be of interest to each other. Web portals in the public space start to build user profiles for individuals and recommend content based on an individual person's interests, either declared or inferred. The effectiveness of interest-centric information organization and recommendation is highly relied on the accuracy of user profiling. Oftentimes, however, a person may not like to declare her/his interests, whether in a semi-private space or a public space. In that case, the accuracy of user profiling can only be relied on estimation, which can be questionable. Accordingly, neither of the application-centric, domain-centric, and interest-centric ways works well in dealing with the information explosion challenge.

FIG. 1 depicts a traditional scheme of information organization and retrieval in different spaces in a segregated and disorganized manner. A person 102 has to interact with information in private space 104, semi-private space 106, and public space 108 via unrelated and separate means 110, 112, 114, respectively. For accessing private data from the private space 104, means 110, such as email applications, email sites, local or remote Contacts and calendars, etc., has to be selected and used. Each means 110 is domain or application-oriented, allowing the person 102 to access information related to the domain with the specific application that the means 110 is developed for. Even for information residing within different applications/domains in the private space 104, a person 102 still has to go by different means 110 to access content of each application/domain, which is not convenient and not person-centric. For example, in order to find out the phone numbers of attendees of a birthday party, the person 102 has to first find all the confirmation emails from the attendees (may be sent in different emails and even to different email accounts), write down each name, and open different Contacts to look for their phone numbers.

Similarly, for interacting with the semi-private space 106, a person 102 needs to use a variety of means 112, each of which is developed and dedicated for a specific semi-private data source. For example, Facebook desktop application, Facebook mobile app, and Facebook site are all means for accessing information in the person 102's Facebook account. But when the person 102 wants to open any document shared on Dropbox by a Facebook friend, the person 102 has to switch to another means dedicated to Dropbox (a desktop application, a mobile app, or a website). As shown in FIG. 1, information may be transmitted between the private space 104 and the semi-private space 106. For instance, private photos can be uploaded to a social media site for sharing with friends; social media or data sharing sites may send private emails to a person 102's private email account notifying her/him of status updates of social friends. However, such information exchange does not automatically create any linkage between data between the private and semi-private spaces 104, 106. Thus, there is no application that can keep track of such information exchange and establish meaningful connections, much less utilizing the connections to make it easier to search for information.

As to the public space 108, means 114 such as traditional search engines (e.g., www.Google.com) or web portals (e.g., www.CNN.com, www.AOL.com, www.IMDB.com, etc.) are used to access information. With the increasing challenge of information explosion, various efforts have been made to assist a person 102 to efficiently access relevant and on-the-point content from the public space 108. For example, topical portals have been developed that are more domain-oriented as compared to generic content gathering systems such as traditional search engines. Examples include topical portals on finance, sports, news, weather, shopping, music, art, movies, etc. Such topical portals allow the person 102 to access information related to subject matters that these portals are directed to. Vertical search has also been implemented by major search engines to help to limit the search results within a specific domain, such as images, news, or local results. However, even if limiting the search result to a specific domain in the public space 108, there is still an enormous amount of available information, putting much burden on the person 102 to identify desired information.

There is also information flow among the public space 108, the semi-private space 106, and the private space 104. For example, www.FedeEx.com (public space) may send a private email to a person 102's email account (private space) with a tracking number; a person 102 may include URLs of public websites in her/his tweets to followers. However, in reality, it is easy to lose track of related information residing in different spaces. When needed, much effort is needed to dig them out based on memory via separate means 110, 112, 114 across different spaces 104, 106, 108. In today's society, this consumes more and more people's time.

Because information residing in different spaces or even within the same space is organized in a segregated manner and can only be accessed via dedicated means, the identification and presentation of information from different sources (whether from the same or different spaces) cannot be made in a coherent and unified manner. For example, when a person 102 searches for information using a query in different spaces, the results yielded in different search spaces are different. For instance, search result from a conventional search engine directed to the public space 108 is usually a search result page with "blue links," while a search in the email space based on the same query will certainly look completely different. When the same query is used for search in different social media applications in the semi-private space 106, each application will again likely organize and present the search result in a distinct manner. Such inconsistency affects user experience. Further, related information residing in different sources is retrieved piece meal so that it requires the person 102 to manually connect the dots provide a mental picture of the overall situation.

Therefore, there is a need for improvements over the conventional approaches to organize, retrieve, present, and utilize information.

SUMMARY

The present teaching relates to methods, systems, and programming for providing search query suggestions, and more specifically, to providing search query suggestions to a person based on a number of data sources that include person's personal data and non-personal data.

In one example, a method, implemented on at least one computing device each of which has at least one processor, storage, and a communication platform connected to a network for providing query suggestions, is disclosed. The method may include receiving an input from a person, obtaining one or more suggestions based on a person corpus derived from at least one data source private to the person, and presenting at least the one or more suggestions.

In another example, a system having at least one processor, storage, and a communication platform, to provide query suggestions, is disclosed. The system may include a request processing unit, a first suggestion retrieving module, and a query suggestion generation module. The request processing unit, implemented using the at least one processor, may be configured to receive an input from a person. The first suggestion retrieving module, implemented using the at least one processor, may be configured to obtain one or more suggestions based on a person corpus derived from at least one data source private to the person. The query suggestion generation module, implemented using the at least one processor, may be configured to provide at least the one or more suggestions Other concepts relate to software to implement the present teachings on providing query suggestions. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon to provide query suggestions, when read by the machine, causes the machine to perform a plurality of operations. Such operations may include receiving an input from a person, obtaining one or more suggestions based on a person corpus derived from at least one data source private to the person, and presenting at least the one or more suggestions.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

The present teaching describes methods, systems, and programming aspects of efficiently and effectively organizing, retrieving, presenting, and utilizing information.

Figure 1:
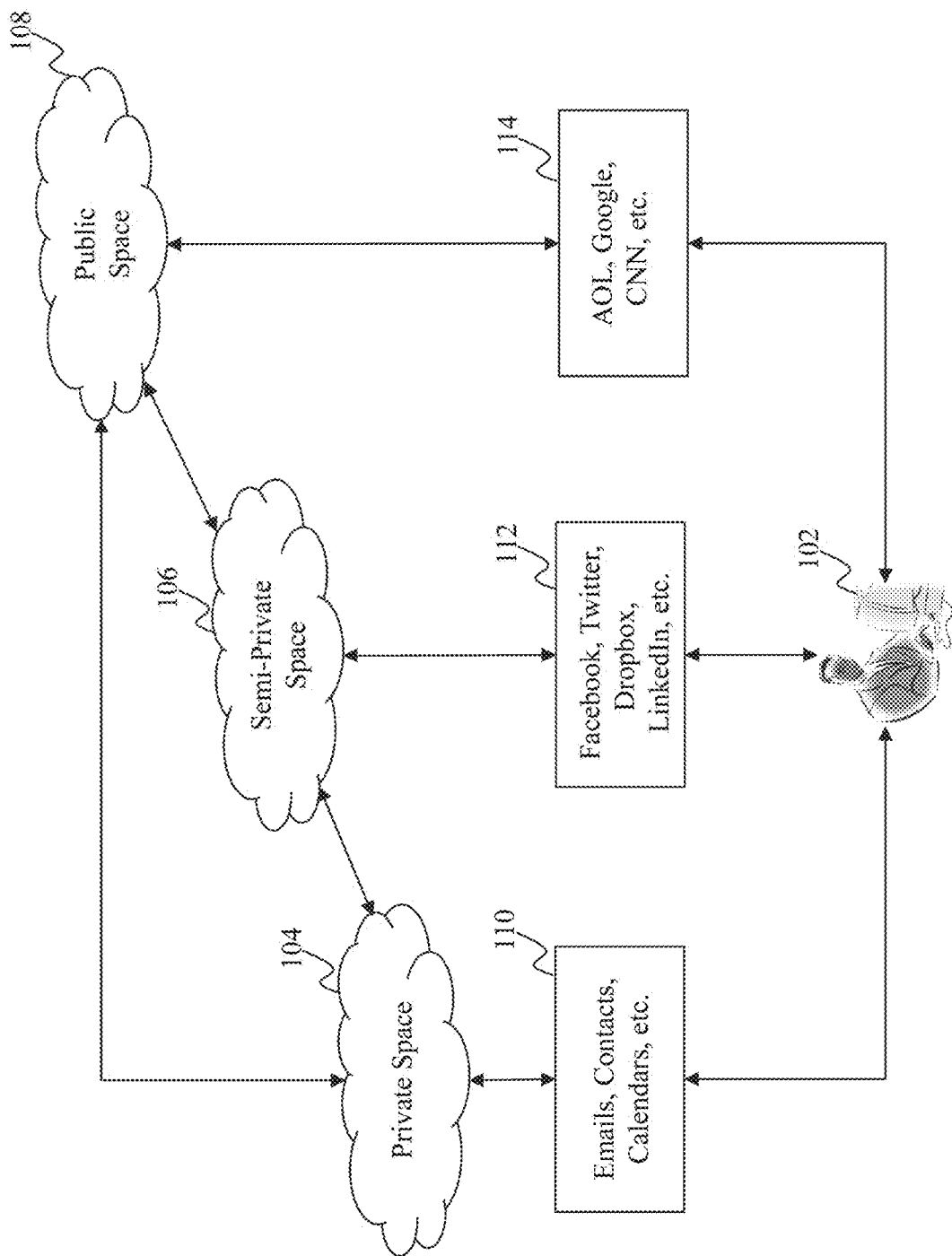
FIG. 1 (prior art) depicts a traditional scheme of information organization and retrieval from different spaces in a segregated and disorganized manner.
Figure 2:
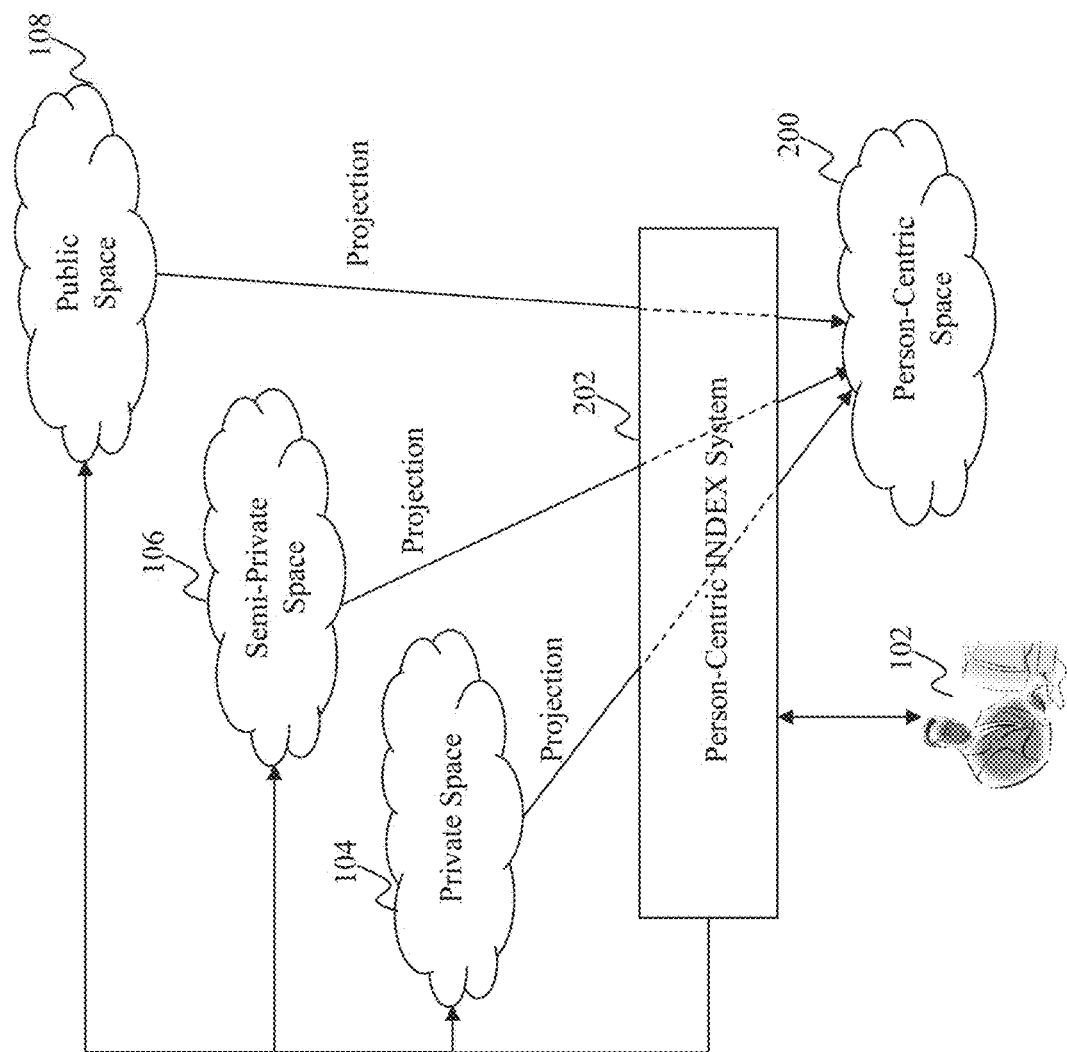
FIG. 2 depicts a novel scheme of building a person-centric space for a person by cross-linking data from different spaces and applications thereof, according to an embodiment of the present teaching.

FIG. 2 depicts a novel scheme of building a person-centric space 200 for a person 102 by cross-linking data from different spaces and applications thereof, according to an embodiment of the present teaching. Unlike the traditional approach to organize information in different spaces in a segregated and disorganized manner, as illustrated in FIG. 1, FIG. 2 provides a person-centric INDEX system 202, which builds the person-centric space 200 specific to the person 102 by digesting information from the public space 108, semi-private space 106, and private space 104 and cross-linking relevant data from those spaces 104, 106, 108. As described herein, a person 102 referred herein may include a human being, a group of people, an organization such as a business department or a corporation, or any unit that can use the person-centric INDEX system 202. A space, whether private, semi-private, or public, may be a collection of information in one or more sources. Through the person-centric INDEX system 202, information relevant to the person 102 from each of the private, semi-private, and public spaces 104, 106, and 108 is projected, into the person-centric space 200 in a meaningful manner. That is, a part of the data in the person-centric space 200 is projected from the public space 108 in a manner relevant to the person 102; a part of the data in the person-centric space 200 is projected from the semi-private space 106 in a manner relevant to the person 102; a part of the data in the person-centric space 200 is projected from the private space 104. Thus, the person-centric space 200 is an information universe meaningful to the person 102 and formed from the perspective of the person 102.

Different from conventional approaches, which organize information in an application-centric, domain-centric, or interest-centric manner, the person-centric INDEX system 202 recognizes relevant information from the enormous information available in the public space 108, semi-private space 106, and private space 104 in accordance with the perspective of the person 102, thereby filtering out information that is not relevant to the person 102, assisting the person 102 to make sense out of the relevance among different pieces of information in the person-centric space. The person-centric space 200 is dynamic and changes with the online (possibly offline) activities of the person 102. For example, the person 102 can search more content via the person-centric INDEX system 202 (this function may be similar to conventional search engine) that will lead to the continuously expansion of the person-centric space 200. The person-centric INDEX system 202 can cross-link data across information different spaces, or information from different sources in the same space. For instance, by identifying a FedEx tracking number in an order confirmation email sent to a personal email account from www.Amazon.com, the person-centric INDEX system 202 can automatically search for any information in any space that is relevant to the tracking number, such as package delivery status information from www.FedEx.com in the public space 108. Although most information from www.FedEx.com may not be related to the person 102, the particular package delivery status information relevant to the person 102 and can be retrieved by the person-centric INDEX system 202 and indexed against the information from the person 102's private emails. In other words, the package delivery status information, even though from the public space 108, can be projected into the person-centric space 200 and, together with other information in the person-centric space 200 (such as a confirmation email related to the package), the person-centric INDEX system 202 integrates relevant information from different sources to yield unified and semantically meaningful information, such as a card related to an order incorporating the name of the ordered item, the name of the person who ordered it, the name of the company that is to deliver the item, as well as the current delivery status.

In another example, when a private email reminding of an upcoming soccer game from a coach is received, the person-centric INDEX system 202 may be triggered to process the private email and identify, based on the content of the email, certain information in the sports domain such as date/time, location, and players and coaches of the soccer game and cross link the email with such information. The person-centric INDEX system 202 may also retrieve additional relevant information from other data sources, such as phone number of the coach from Contacts of the person 102. The person-centric INDEX system 202 may also retrieve map and directions to the soccer game stadium from Google Maps based on the location information and retrieve weather forecast of the game from www.Weather.com based on the date. If the coach is connected with the person 102 in any social media, then the person-centric INDEX system 202 may go to the social media site in the semi-private space 106 to retrieve any content made by the coach that is relevant to the soccer game. In this example, all those different pieces of information from the public space 108, semi-private space 106, and private space 104 are cross-linked and projected to the person-centric space 200 in accordance with the person 102's perspective on the soccer game.

The person-centric INDEX system 202 may build the initial person-centric space 200 when the person 102 first time accesses the person-centric INDEX system 202. By analyzing all the information in the private space 104 which the person 102 has granted access permission, the person-centric INDEX system 202 can identify, retrieve, and link relevant information from the public space 108, semi-private space 106, and private space 104 and project them into the person-centric space 200. As mentioned above, the person-centric INDEX system 202 also maintains and updates the person-centric space 200 in a continuous or dynamic manner. In one example, the person-centric INDEX system 202 may automatically check any change, either in the private space 104 or otherwise, based on a schedule and initiates the update of the person-centric space 200 when necessary. For example, every two hours, the person-centric INDEX system 202 may automatically check any new email that has not been analyzed before. In another example, the person-centric INDEX system 202 may automatically check any change occurring in the public space 108 and the semi-private space 106 that is relevant to the person 102. For instance, in the soccer game example descried above, every day before the scheduled soccer game, the person-centric INDEX system 202 may automatically check www.Weather.com to see if the weather forecast needs to be updated. The person-centric INDEX system 202 may also update the person-centric space 200 responsive to some triggering event that may affect any data in the person-centric space 200. For example, in the FedEx package example described above, once the scheduled delivery date has passed or a package delivery email has been received, the person-centric INDEX system 202 may update the person-centric space 200 to remove the temporary relationship between the person 102 and www.FedEx.com until a new connection between them is established again in the future. The triggering event is not limited to events happening in the public space 108, semi-private space 106, or private space 104, but can include any internal operation of the person-centric INDEX system 202. As an example, every time the person-centric INDEX system 202 performs a search in response to a query or to answer a question, it may also trigger the person-centric INDEX system 202 to update the person-centric space 200 based on, e.g., newly retrieved information related to, e.g., a search result or some answers. When the search result or answers cannot be found in the person-centric space 200, the person-centric INDEX system 202 may also update the person-centric space 200 to include those search results and answers. That is, the person-centric INDEX system 202 may dynamically update the person-centric space 200 in response to any suitable triggering events.

To better understand information in the person-centric space 200 and make it meaningful, the person-centric INDEX system 202 may further build a person-centric knowledge database including person-centric knowledge by extracting and associating data about the person 102 from the person-centric space 200. The person-centric INDEX system 202 can extract entities related to the person 102 and infer relationships between the entities without the person 102's explicit declaration. A person-centric knowledge representation for the person 102 can be created by person-centric INDEX system 202 the based on the entities and relationships. The inference can be based on any information in the person-centric space 200. The knowledge elements that can be inferred or deduced may include the person 102's social contacts, the person 102's relationships with places, events, etc.

In order to construct the person-centric knowledge representation, the person-centric INDEX system 202 may extract entities from content in the person 102's person-centric space 200. These entities can be places like restaurants or places of interest, contact mentions like names, emails, phone numbers or addresses, and events with date, place and persons involved. In addition to extracting these mentions, the person-centric INDEX system 202 can resolve them to what they refer to (i.e. can disambiguate an extracted entity when it may refer to multiple individuals). For example, a word "King" in a private email may refer to a title of a person who is the King of a country or refer to a person's last name. The person-centric INDEX system 202 may utilize any information in the person-centric space 200 to determine what type of entity the word "King" refers to in the email. In addition to determining an entity type for an extracted entity name, the person-centric INDEX system 202 may also determine a specific individual referred to by this entity name. As one instance, a person's first name may refer to different Contacts, and a same restaurant name can refer to several restaurants. The person-centric INDEX system 202 can make use of contextual information and/or textual metadata associated with the entity name in the email to disambiguate such cases, thereby providing a high precision resolution. With the precise disambiguation, the person-centric INDEX system 202 can find right information from unstructured personal data and provide it in a structured way (e.g. in a graph associated with the person 102). In contrast to a conventional personal profile, the person-centric INDEX system 202 generates a single personal graph for an individual to encompass connections, interests, and events associated with the person 102. It can be understood that a person-centric knowledge may also be represented in a format other than a graph.

The person-centric INDEX system 202, in conjunction with the person-centric space 200, may organize related information from different sources and provide the information to a person 102 in a user-friendly, unified presentation style. In addition to providing requested information in any known format, such as hyperlinks on a search results page, the person-centric INDEX system 202 may present information in intent-based cards. Unlike existing entity-based search results cards organizing results based on an entity, the person-centric INDEX system 202 may focus on a person 102's intent to dynamically build a card for the person 102. The intent may be explicitly specified in the query, or estimated based on the context, trending events, or any knowledge derived from the person-centric space 200. Knowing the person 102's intent when the card is created to answer the query, the person-centric INDEX system 202 can provide relevant information on the card. The relevant information may include partial information associated with the entity in the query, and/or additional information from the person-centric space 200 that is related to the person's intent. In the soccer game example descried above, in response to the person's query or question related to the soccer game, the person-centric INDEX system 202 may estimate the person's intent is to know the date/time of the game and thus, build a card that includes not only the direct answer of the date/time but also other information related to the soccer game in the person-centric space 200, such as the map and directions, weather forecast, and contact information of the coach.

In one embodiment, knowing the current intent of the person 102, the person-centric INDEX system 202 can anticipate the next intent of the person 102, such that the current card provided by the person-centric INDEX system 202 can lead to next steps. For example, the person-centric INDEX system 202 can anticipate that after looking at the show times of a new movie, the person 102 will be likely to buy tickets. In another embodiment, focusing on the person 102's intent, the person-centric INDEX system 202 can answer the person 102 with a card even when there is no entity in the query or request (i.e., in a query-less or anticipatory use case). For example, if the person-centric INDEX system 202 determines that the person 102 has a behavior pattern of searching traffic information from work place to home at 5 pm on workdays, then from now on, the person-centric INDEX system 202 may automatically generate and provide a notice card to the person 102 at around 5 pm on every workday, to notify the person 102 about the traffic information regardless whether a query is received from the person 102.

The person-centric INDEX system 202 can be used for both building the person-centric space 200 for a person 102 and facilitating the person 102 to apply the person-centric space 200 in a variety for applications. Instead of using different means 110, 112, 114 shown in FIG. 1 to access different data sources across different spaces, the person-centric INDEX system 202 can serve as a centralized interface between the person 102 and her/his own person-centric space 200, thereby reducing the time and efforts spent by the person 102 on retrieving desired information or any other applications. As different pieces of relevant information from the public space 108, semi-private space 106, and private space 104 have been projected to the person-centric space 200 in a well-organized way, they can be handled by a single person-centric INDEX system 202, thereby improving the efficiency and effectiveness in finding the desired information. For example, in the FedEx package example described above, any time the person wants to know the current status of the package, she/he no longer needs to dig out the email with the tracking number, write down the tracking number, and open www.FedEx.com in a browser and type in the tracking number. The person-centric INDEX system 202 may have already stored the package delivery status information since the time when the initial order email was received and have kept updating the package delivery status information in the person-centric space 200. So any time when the person 102 inputs a request for package delivery status update, either in the form of a search query or a question n, the person-centric INDEX system 202 can go directly to retrieve the updated package delivery status information from the person-centric space 200 or automatically call the tracking application programming interface (API) of FedEx server with the stored tracking number for the current status update. The result is then provided to the person 102 without any additional efforts made by the person 102. In some embodiments, the person 102 may not even need to explicitly request the status update. Responsive to receiving the order confirmation email, the person-centric INDEX system 202 may automatically set up a task to regularly send the status update to the person 102 until the package is delivered or may dynamically notify the person 102 with any event, like if the package is delayed or lost.

In one aspect of the present teaching, the person-centric INDEX system 202, in conjunction with the person-centric space 200, can be used for answering questions. To achieve this, the person-centric INDEX system 202 may classify a question from a person 102 into a personal question or a non-personal question. In some embodiment, data from the person-centric space 200 may be for classification. For example, a question related to "uncle Sam" may be classified as a personal question if "uncle Sam" is a real person identified from the private Contacts. Once the question is classified as personal, the person-centric INDEX system 202 may extract various features including entities and relationships from the question. The extracted entities and relationships may be used by the person-centric INDEX system 202 to traverse a person-centric knowledge database derived from the person-centric space 200. In some embodiments, the person-centric knowledge database may store data in a triple format including one or more entities and relationships between the one or more entities. When an exact match of relationship and entity are found, an answer is returned. When there is no exact match, a similarity between the question and answer triples is taken into consideration and used to find the candidate answers. In the "uncle Sam" example described above, if the question is "where is uncle Sam," the person-centric INDEX system 202 may search the person-centric knowledge database for any location entity that has a valid relationship with the entity "uncle Sam." In one example, a recent email may be sent by "uncle Sam," and the email may also mention that he will be attending a conference on these days. The location of the conference can be retrieved from the conference website in the public space 108, stored in the person-centric space 200, and associated with entity "uncle Sam." Based on the relationship, the person-centric INDEX system 202 can answer the question with the location of the conference. The person-centric INDEX system 202 thus provides an efficient solution to search for answers to personal questions and increases user engagement and content understanding.

In another aspect of the present teaching, the person-centric INDEX system 202, in conjunction with the person-centric space 200, can be used for task completion. Task completion often involves interactions with different data sources across different spaces. A task such as "making mother's day dinner reservation" involves task actions such as identifying who is my mother, checking what date is mother's day this year, finding out a mutually available time slot on mother's day for my mother and me, picking up a restaurant that my mother and I like, making an online reservation on the restaurant's website, etc. Traditionally, in order to complete each task action, a person 102 has to open a number of applications to access information from different sources across different spaces and perform a series of tedious operations, such as searching for "mother's day 2015" in a search engine, checking my own calendar and mother's shared calendar, digging out past emails about the restaurant reservations for dinners with my mother, making online reservation via a browser, etc. In contrast to the traditional approaches for task completion, the person-centric INDEX system 202 can complete the same task more efficiently and effectively because all pieces of information related to mother's day dinner reservation have already been projected to the person-centric space 200. This makes automatic task generation and completion using the person-centric INDEX system 202 possible. In response to receiving an input of "making mother's day dinner reservation" from a person 102, the person-centric INDEX system 202 can automatically generate the list of task actions as mentioned above and execute each of them based on information from the person-centric space 200 and update the person 102 with the current status of completing the task.

With the dynamic and rich information related to the person 102 that is available in the person-centric space 200, the person-centric INDEX system 202 can even automatically generate a task without any input from the person 102. In one embodiment, anytime a card is generated and provided to the person 102, the information on the card may be analyzed by the person-centric INDEX system 202 to determine whether a task needs to be generated as a follow-up of the card. For example, once an email card summarizing an online order is constructed, the person-centric INDEX system 202 may generate a task to track the package delivery status until it is delivered and notify any status update for the person 102. In another embodiment, any event occurring in the public space 108, semi-private space 106, or private space 104 that is relevant to the person 102 may trigger the task completion as well. For instance, a flight delay message on an airline website in the public space 108 may trigger generation of a task for changing hotel, rental car, and restaurant reservations in the same trip. In still another embodiment, the person 102's past behavior patterns may help the person-centric INDEX system 202 to anticipate her/his intent in the similar context and automatically generate a task accordingly. As an instance, if the person 102 always had a dinner with her/his mother on mother's day at the same restaurant, a task may be generated by the person-centric INDEX system 202 this year, in advance, to make the mother's day dinner reservation at the same restaurant.

It is understood that in some occasions, certain task actions may not be completed solely based on information from the person-centric space 200. For example, in order to complete the task "sending flowers to mom on mother's day," flower shops need to be reached out to. In one embodiment of the present teaching, a task exchange platform may be created to facilitate the completion of tasks. The person-centric INDEX system 202 may send certain tasks or task actions to the task exchange platform so that parties interested in completing the task may make bids on it. The task exchange platform alone, or in conjunction with the person-centric INDEX system 202, may select the winning bid and update the person 102 with the current status of task completion. Monetization of task completion may be achieved by charging service fee to the winning party and/or the person 102 who requests the task.

In still another aspect of the present teaching, the person-centric INDEX system 202, in conjunction with the person-centric space 200, can be used for query suggestions. By processing and analyzing data from the person-centric space 200, the person-centric INDEX system 202 may build a user corpus database, which provides suggestions based on information from the private space 104 and/or semi-private space 106. In response to any input from a person 102, the person-centric INDEX system 202 may process the input and provide suggestions to the person 102 at runtime based on the person 102's relevant private and/or semi-private data from the user corpus database as well other general log-based query suggestion database and search history database. The query suggestions may be provided to the person 102 with very low latency (e.g., less than 10 ms) in response to the person 102's initial input. Further, in some embodiments, before presenting to the person 102, suggestions generated using the person 102's private and/or semi-private data from the user corpus database may be blended with suggestions produced based on general log-based query suggestion database and search history database. Such blended suggestions may be filtered and ranked based on various factors, such as type of content suggested (e.g., email, social media information, etc.), estimated intent based on an immediate previous input from the person 102, context (e.g., location, data/time, etc.) related to the person 102, and/or other factors.

Figure 3:
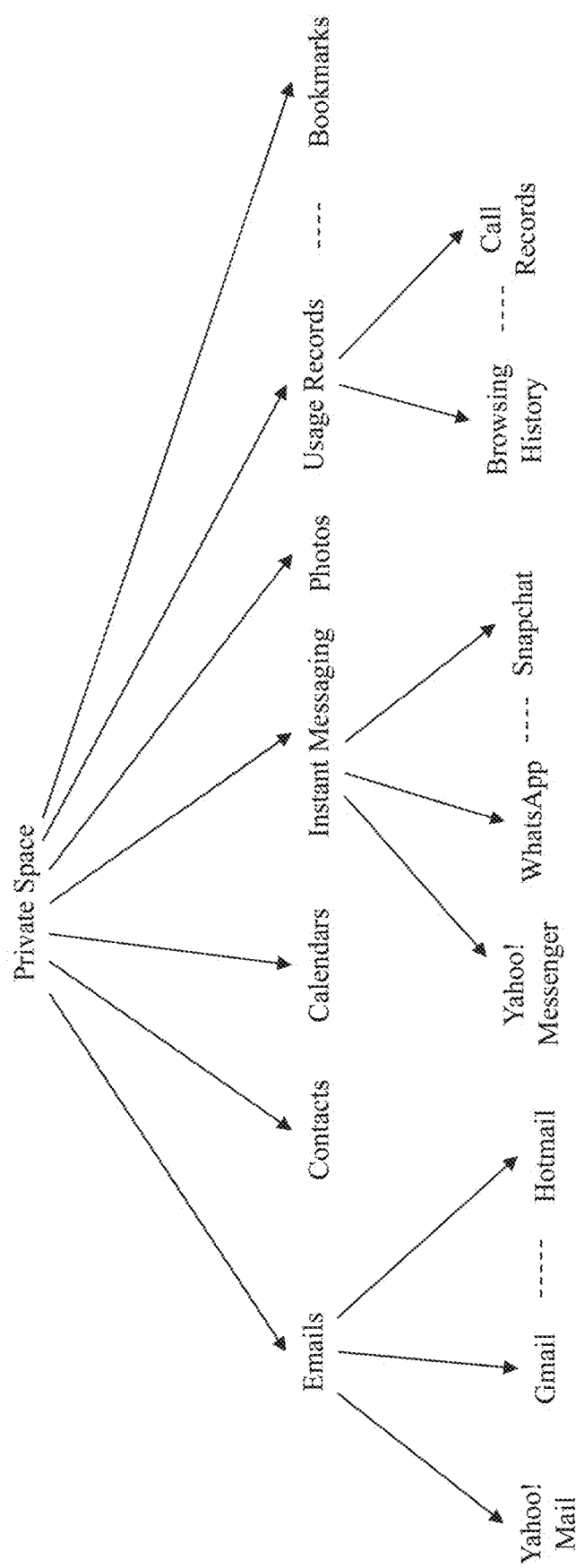
FIG. 3 illustrates exemplary types of data sources in a private space.

FIG. 3 illustrates exemplary types of data sources in a private space. The private space of a person may include any data source that is private to the person. For example, the private space may include any data source that requires access information of the person (e.g., password, token, biometric information, or any user credentials). The private space may also include any data source that is intended to be accessed only by the person even without requiring access control, such as data on a person's smart phone that does not require password or finger print verification. In this illustration, the private space includes several categories of data sources such as emails, Contacts, calendars, instant messaging, photos, usage records, bookmarks, etc. Emails include emails stored in remote email servers such as Yahoo! Mail, Gmail, Hotmail, etc. and local emails in an email application on a personal computer or mobile device. Instant messaging includes any messages communicated between the person 102 and others via any instant messaging applications, for example, Yahoo! Messenger, WhatsApp, Snapchat, to name a few. Usage records may be any logs private to the person, such as, but not limited to, browsing history and call records. It is understood that the examples described above are for illustrative purpose and are not intended to be limiting.

Figure 4:
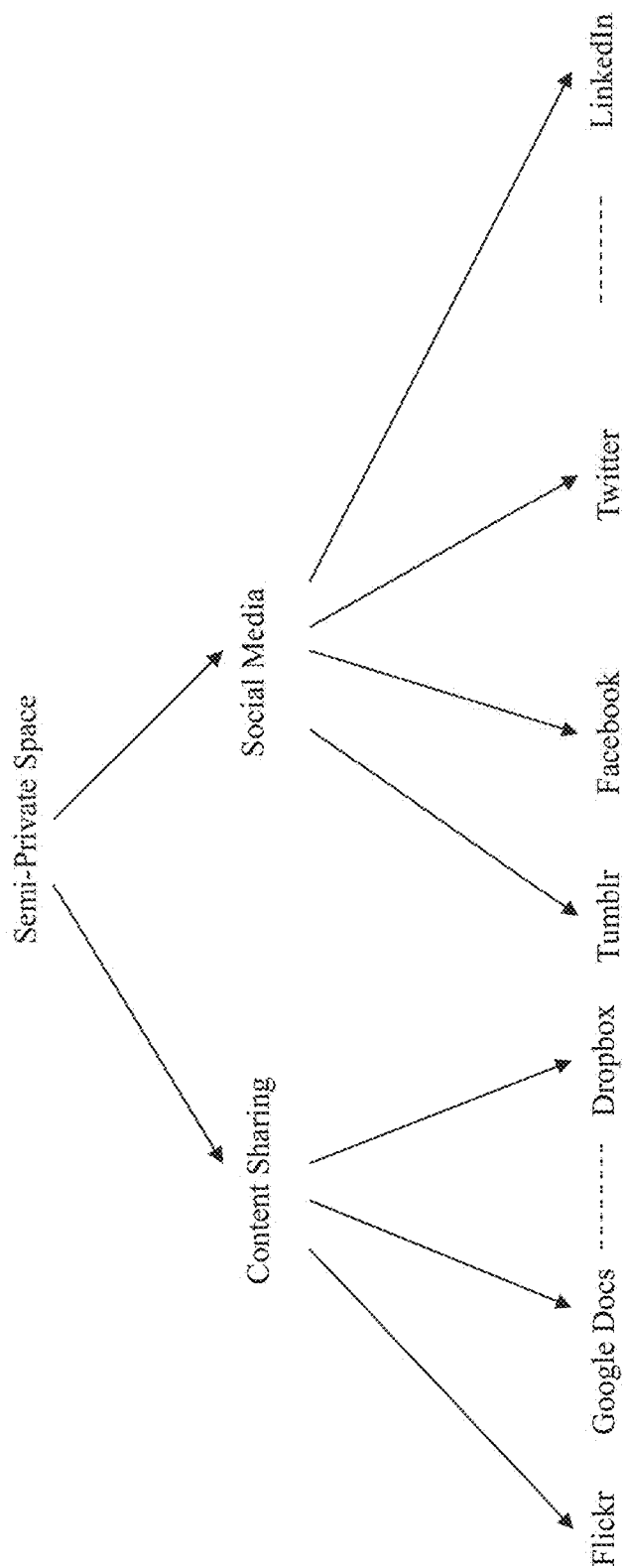
FIG. 4 illustrates exemplary types of data sources in a semi-private space.

FIG. 4 illustrates exemplary types of data sources in a semi-private space. The semi-private space of a person may include any data source that is accessible for a group of people designated by the person. One example of data sources in the semi-private space is social media, such as Tumblr, Facebook, Twitter, LinkedIn, etc. A person can designate a group of people who can access her/his information shared in the social media sites, such as status updates, posts, photos, and comments. Another example of data sources in the semi-private space is a content sharing site. For instance, a person can share photos with family and friends at Flickr, share work documents with colleagues or classmates at Google Docs, and share any files at Dropbox. It is understood that in some cases, there is not a clear boundary between a data source in the private space and a data source in the semi-private space. For instance, if a person restricts photos at Flickr to be only accessible by her/himself, then Flickr becomes a private source of the person, just like local photos stored on the person's device. Similarly, when the entire or a portion of a calendar is shared with others, the calendar becomes part of the semi-private space. It is understood that the examples described above are for illustrative purpose and are not intended to be limiting.

Figure 5:
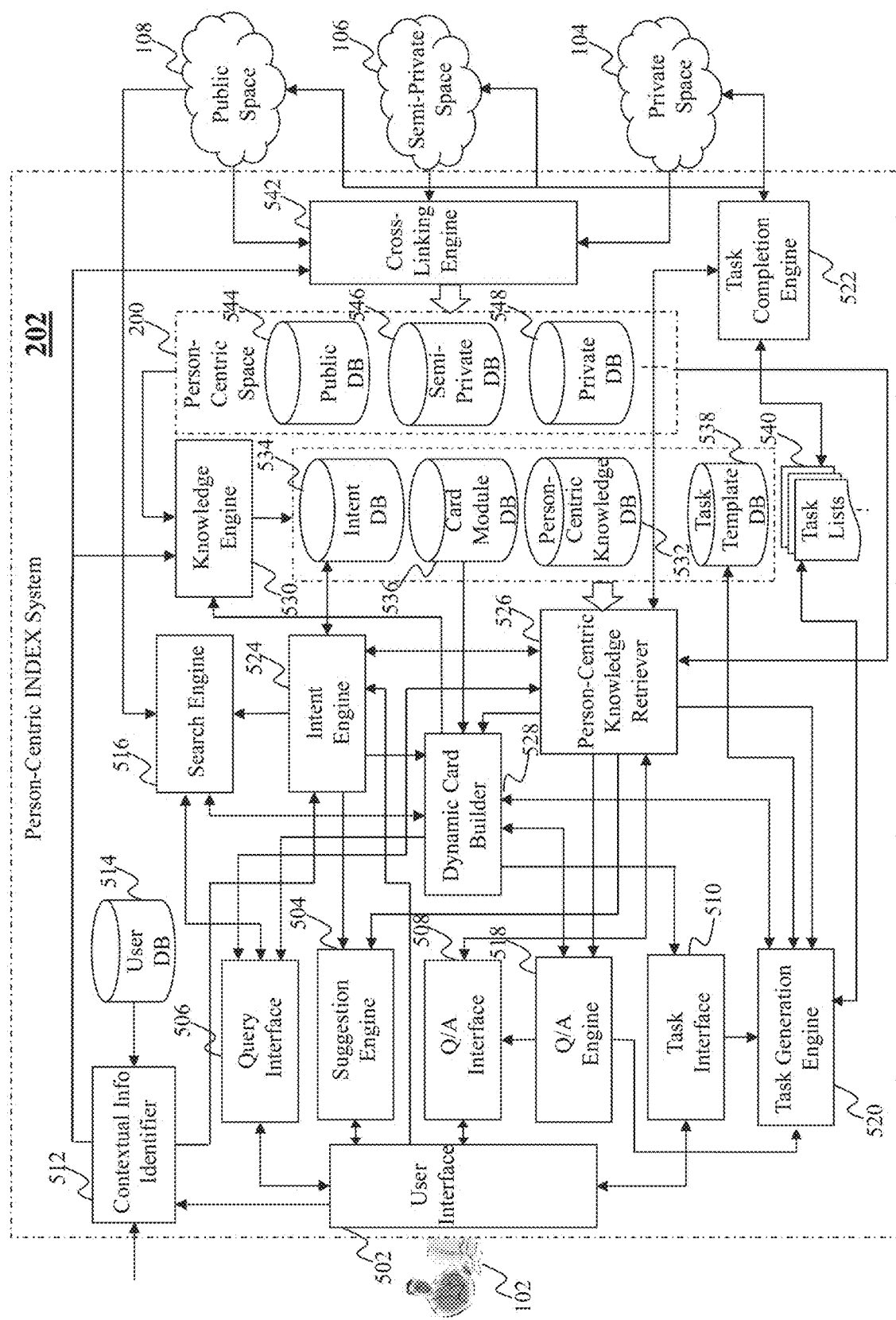
FIG. 5 depicts an exemplary system diagram of a person-centric INDEX system, according to an embodiment of the present teaching.

FIG. 5 depicts an exemplary system diagram of the person-centric INDEX system 202, according to an embodiment of the present teaching. The person-centric INDEX system 202 includes a user interface 502 that connects a person 102 with multiple front-end components including a suggestion engine 504, a query interface 506, a Q/A interface 508, a task interface 510, and a contextual information identifier 512 coupled with a user database 514. To support the front-end components, the person-centric INDEX system 202 further includes multiple functional components including a search engine 516, a Q/A engine 518, a task generation engine 520, a task completion engine 522, an intent engine 524, a person-centric knowledge retriever 526, and a dynamic card builder 528. In the back-end, the person-centric INDEX system 202 includes a variety of databases for storing information in different forms for different purposes, such as the person-centric space 200 having a public database 544, a semi-private database 546, and a private database 548. The person-centric space 200 in this embodiment is built up by a cross-linking engine 542. The person-centric INDEX system 202 further includes a knowledge engine 530 for building a person-centric knowledge database 532 by processing and analyzing information in the person-centric space 200. In addition, additional types of analytic results from the knowledge engine 530 based on data from the person-centric space 200 and/or any other suitable data sources may be stored in an intent database 534, a card module database 536, and a task template database 538.

A person 102 may interact with the person-centric INDEX system 202 via the user interface 502 by providing an input. The input may be made by, for example, typing in a query, question, or task request, or clicking or touching any user interface element in the user interface 502 to enter a query, question, or task request. With each input from the person 102, the suggestion engine 504 provides a list of suggestions to facilitate the person 102 to complete the entire input. In this embodiment, the suggestion engine 504 may provide suggestions based on the person's private and/or semi-private information retrieved by the person-centric knowledge retriever 526 from the person-centric space 200 and/or the person-centric knowledge database 532. Those suggestions include, for example, a contact name from the private Contacts, part of a tweet from Twitter, or a package tracking status stored in the person-centric space 200. In some embodiments, the suggestion engine 504 may blend those suggestions based on the person 102's private and/or semi-private information with the conventional suggestions based on popular query logs and search history. In this embodiment, the intent engine 524 may provide an estimated intent associated with each input to help filtering and/or ranking the suggestions provided to the person 102.

Each of the query interface 506, Q/A interface 508, and task interface 510 is configured to receive a particular type of user inputs and forward them to the respective engine for handling. Once the results are returned from the respective engine and/or from the dynamic card builder 528, each of the query interface 506, Q/A interface 508, and task interface 510 forwards the results to the user interface 502 for presentation. In one embodiment, the user interface 502 may first determine the specific type of each input and then dispatch it to the corresponding interface. For example, the user interface 502 may identify that an input is a question based on semantic analysis or keyword matching (e.g., looking for keywords like "why" "when" "who," etc. and/or a question mark). The identified question is then dispatched to the Q/A interface 508. Similarly, the user interface 502 may determine, based on semantic analysis and/or machine learning algorithms, that an input is a task request and forward the input to the task interface 510. For any input that cannot be classified or does not fall within the categories of question and task request, the user interface 502 may forward it to the query interface 506 for general query search. It is understood that, in some embodiments, the user interface 502 may not classify an input first, but instead, forward the same input to each of the query interface 506, Q/A interface 508, and task interface 510 to have their respective engines to process the input in parallel.

Another function of the user interface 502 involves presenting information to the person 102 either as responses to the inputs, such as search results, answers, and task status, or as spontaneous notices, reminders, and updates in response to any triggering events. In this embodiment, the information to be presented to the person 102 via the user interface 502 may be presented in the form of cards that are dynamically built on-the-fly by the dynamic card builder 528 based on the intent estimated by the intent engine 524. The cards may be of different types, such as an email card summarizing one or more related emails, a search results card summarizing information relevant to one or more search results, an answer card including an answer to a question with additional information associated with the answer, or a notice card that is automatically generated to notify the person 102 of any event of interest. Based on its type, a card may be dispatched to one of the query interface 506, Q/A interface 508, and task interface 510 and eventually presented to the person 102 via the user interface 502. In addition to cards, information in any other format or presentation styles, such as search results in a research results page with "blue links" or answers in plain text, may be provided by the search engine 516 and the Q/A engine 518 directly to the query interface 506 and Q/A interface 508, respectively. It is understood that the user interface 502 may also provide information in a hybrid matter, meaning that some information may be presented as cards, while other information may be presented in its native format or style.

As the user interface 502 receives an input from the person 102, it also triggers the contextual information identifier 512 to collect any contextual information related to the person 102 and the input of the person 102. The contextual information identifier 512 in this embodiment receives user-related information from the user database 514, such as the person 102's demographic information and declared and inferred interests and preferences. Another source of contextual information is the person 102's device including, for example, date/time obtained from the timer of the person 102's device, location obtained from a global positioning system (GPS) of the person 102's device, and information related to the person 102's device itself (e.g., the device type, brand, and specification). Further, the contextual information identifier 512 may also receive contextual information from the user interface 502, such as one or more inputs immediately before the current input (i.e., user-session information). Various components in the person-centric INDEX system 202, including the cross-linking engine 542, knowledge engine 530, and intent engine 524, may take advantage of the contextual information identified by the contextual information identifier 512.

The intent engine 524 in this embodiment has two major functions: creating and updating the intent database 534 and estimating an intent based on the information stored in the intent database 534. The intent database 534 may store a personal intent space which includes all the intents that make sense to the person 102 in the form of an action plus a domain. For example, based on the person 102's search history, the intent engine 524 may identify that the person 102 has repeatedly entered different queries all related to the same intent "making restaurant reservations." This intent then may be stored as a data point in the person's personal intent space in the intent database 534 in the form of {action=making reservations; domain=restaurant}. More and more data points will be filled into the personal intent space as the person 102 continues interacting with the person-centric INDEX system 202. In some embodiments, the intent engine 524 may also update the personal intent space in the intent database 534 by adding new intents based on existing intents. For instance, the intent engine 524 may determine that hotel is a domain that is close to the restaurant domain and thus, a new intent "making hotel reservations" (in the form of {action=making reservations; domain=hotel}) likely makes sense to the person 102 as well. The new intent "making hotel reservations," which is not determined from user data directly, may be added to the personal intent space in the intent database 534 by the intent engine 524. In some embodiments, the intent database 534 include a common intent space for the general population. Some intents that are not in the personal intent space may exist in the common intent space. If they are popular among the general population or among people similar to the person 102, then the intent engine 524 may consider those intents as candidates as well in intent estimation.

In estimating intent of the person 102, the intent engine 524 receives the input from the user interface 502 or any information retrieved by the person-centric knowledge retriever 526 and tries to identify any action and/or domain from the input that is also in the intent spaces in the intent database 534. If both action and domain can be identified from the input, then an intent can be derived directly from the intent space. Otherwise, the intent engine 524 may need to take the contextual information from the contextual information identifier 512 to filter and/or rank the intent candidates identified from the intent space based on the action or domain. In one example, if the input involves only the action "making reservations" without specifying the domain, the intent engine 524 may first identify a list of possible domains that can be combined with such action according to the personal intent space, such as "hotel" and "restaurant." By further identifying that the location where the input is made is at a hotel, the intent engine 524 may estimate that the person 102 likely intends to make restaurant reservations as he is already in the hotel. It is understood that in some cases, neither action nor domain can be identified from the input or the identified action or domain does not exist in the intent space, the intent engine 524 may estimate the intent purely based on the available contextual information. Various components in the person-centric INDEX system 202, including the search engine 516, the suggestion engine 504, the dynamic card builder 528, and the person-centric knowledge retriever 526, may take advantage of the intent estimated by the intent engine 524.

The search engine 516 in this embodiment receives a search query from the query interface 506 and performs a general web search or a vertical search in the public space 108. Intent estimated by the intent engine 524 for the search query may be provided to the search engine 516 for purposes such as query disambiguation and search results filtering and ranking In some embodiments, some or all of the search results may be returned to the query interface 506 in their native format (e.g., hyperlinks) so that they can be presented to the person 102 on a conventional search results page. In this embodiment, some or all of the search results are fed into the dynamic card builder 528 for building a dynamic search results card based on the estimated intent. For instance, if the intent of the query "make reservation" is estimated as "making restaurant reservations," then the top search result of a local restaurant may be provided to the dynamic card builder 528 for building a search results card with the name, directions, menu, phone number, and reviews of the restaurant.

The Q/A engine 518 in this embodiment receives a question from the Q/A interface 508 and classifies the question into either a personal or non-personal question. The classification may be done based on a model such as a machine learning algorithm. In this embodiment, the Q/A engine 518 may check the person-centric knowledge database 532 and/or the private database 548 and semi-private database 546 in the person-centric space 200 via the person-centric knowledge retriever 526 to see if the question is related to any private, semi-private data, or personal knowledge of the person 102. For instance, the question "who is Taylor Swift" is normally classified as a non-personal question. But in the case if "Taylor Swift" is in the person 102's Contacts or social media friend list, or if "Taylor Swift" has sent emails to the person 102, the Q/A engine 518 then may classify the question as a personal question. For non-personal questions, any known approaches may be used to obtain the answers.

Once the question is classified as personal, various features including entities and relationships are extracted by the Q/A engine 518 from the question using, for example, a machine learned sequence tagger. The extracted entities and relationships are used to traverse, by the person-centric knowledge retriever 526, the person-centric knowledge database 532, which stores person-centric relationships stored in a pre-defined form. In some embodiments, the person-centric relationships may be stored in a triple format including one or more entities and a relationship therebetween. When the Q/A engine 518 finds an exact match of relationship and entity, it returns an answer. When there is no exact match, the Q/A engine 518 takes into consideration a similarity between the question and answer triples and uses the similarity to find the candidate answers. To measure the similarity, words embedded over a large corpus of user texts may be collected and trained by the Q/A engine 518. The well-organized, person-centric information stored in the person-centric space 200 and the person-centric knowledge database 532 makes it possible for the Q/A engine 518 to answer a personal question in a synthetic manner without the need of fully understanding the question itself. The answers generated by the Q/A engine 518 may be provided to the dynamic card builder 528 for building answer cards.

The task generation engine 520 and the task completion engine 522 work together in this embodiment to achieve automatic task generation and completion functions of the person-centric INDEX system 202. The task generation engine 520 may automatically generate a task in response to a variety of triggers, including for example, a task request from the person 120 received via the task interface 510, an answer generated by the Q/A engine 518, a card constructed by the dynamic card builder 528, or an event or behavior pattern related to the person 102 from the person-centric space 200 and/or the person-centric knowledge database 532. Intent may have also been taken into account in some embodiments in task generation. The task generation engine 520 in this embodiment also divides each task into a series of task actions, each of which can be scheduled for execution by the task completion engine 522. The task template database 538 stores templates of tasks in response to different triggers. The task generation engine 520 may also access the task template database 538 to retrieve relevant templates in task generation and update the templates as needed. In some embodiments, the task generation engine 520 may call the dynamic card builder 528 to build a card related to one or more tasks so that the person 102 can check and modify the automatically generated task as desired.

The tasks and task actions are stored into task lists 540 by the task generation engine 520. Each task may be associated with parameters, such as conditions in which the task is to be executed and completed. Each individual task action of a task may also be associated with execution and completion conditions. The task completion engine 522 fetches each task from the task lists 540 and executes it according to the parameter associated therewith. For a task, the task completion engine 522 dispatches each of its task actions to an appropriate executor to execute it, either internally through the person-centric knowledge retriever 526 or externally in the public space 108, semi-private space 106, or private space 104. In one example, task actions such as "finding available time on Tuesday for lunch with mom" can be completed by retrieving calendar information from the private database 548 in the person-centric space 200. In another example, task actions like "ordering flowers from Aunt Mary's flower shop" can only be completed by reaching out to the flower shop in the public space 108. The task completion engine 522 may also schedule the execution of each task action by putting it into a queue. Once certain conditions associated with a task action are met, the assigned executor will start to execute it and report the status. The task completion engine 522 may update the task lists 540 based on the status of each task or task action, for example, by removing completed tasks from the task lists 540. The task completion engine 522 may also provide the status updates to the person-centric knowledge retriever 526 such that the status updates of any ongoing task become available for any component in the person-centric INDEX system 202 as needed. For instance, the dynamic card builder 528 may build a notice card notifying the person that your task request "sending flowers to mom on Mother's day" has been completed.

As a component that supports intent-based dynamic card construction for various front-end components, the dynamic card builder 528 receives requests from the search engine 516, the Q/A engine 518, the task generation engine 520, or the person-centric knowledge retriever 526. In response, the dynamic card builder 528 asks for the estimated intent associated with the request from the intent engine 524. Based on the request and the estimated intent, the dynamic card builder 528 can create a card on-the-fly by selecting suitable card layout and/or modules from the card module database 536. The selection of modules and layouts is not predetermined, but may depend on the request, the intent, the context, and information from the person-centric space 200 and the person-centric knowledge database 532. Even for the same query repeatedly received from the same person 102, completely different cards may be built by the dynamic card builder 528 based on the different estimated intents in different contexts. A card may be created by populating information, such as search results, answers, status updates, or any person-centric information, into the dynamically selected and organized modules. The filling of information into the modules on a card may be done in a centralized manner by the dynamic card builder 528 regardless of the type of the card or may be done at each component where the request is sent. For example, the Q/A engine 518 may receive an answer card construction with dynamically selected and organized modules on it and fill in direct and indirect answers into those modules by itself.

In one embodiment, the person-centric knowledge retriever 526 can search the person-centric space 200 and the person-centric knowledge database 532 for relevant information in response to a search request from the intent engine 524, the query interface, the Q/A engine 518, the suggestion engine 504, the dynamic card builder 528, or the task generation engine 520. The person-centric knowledge retriever 526 may identify one or more entities from the search request and search for the matched entities in the person-centric knowledge database 532. As entities stored in the person-centric knowledge database 532 are connected by relationships, additional entities and relationships associated with the matched entities can be returned as part of the retrieved information as well. As for searching in the person-centric space 200, in one embodiment, the person-centric knowledge retriever 526 may first look for private data in the private database 548 matching the entities in the search request. As data in the person-centric space 200 are cross-linked by cross-linking keys, the entities and/or the cross-linking keys associated with the relevant private data may be used for retrieving additional information from the semi-private database 546 and the public database 544. For instance, to handle a search request related to "amazon package," the person-centric knowledge retriever 526 may first look for information in the private database 548 that is relevant to "amazon package." If an order confirmation email is found in the private database 548, the person-centric knowledge retriever 526 may further identify that the order confirmation email is associated with a cross-linking key "tracking number" in the package shipping domain. Based on the tracking number, the person-centric knowledge retriever 526 then can search for any information that is also associated with the same tracking number in the person-centric space 200, such as the package delivery status information from www.FedEx.com in the public database 544. As a result, the person-centric knowledge retriever 526 may return both the order confirmation email and the package delivery status information as a response to the search request.

In some embodiments, the person-centric knowledge retriever 526 may retrieve relevant information from multiple data sources in parallel and then blend and rank all the retrieved information as a response to the search request. It is understood that information retrieved from each source may be associated with features that are unique for the specific source, such as the feature "the number of recipients that are cc'd" in the email source. In order to be able to blend and rank results from different sources, the person-centric knowledge retriever 526 may normalize the features of each result and map them into the same scale for comparison.

The cross-linking engine 542 in this embodiment associates information relevant to the person 102 from the private space 104, the semi-private space 106, and the public space 108 by cross-linking data based on cross-linking keys. The cross-linking engine 542 may first process all information in the private space 104 and identify cross-linking keys from the private space 104. For each piece of content in the private space 104, the cross-linking engine 542 may identify entities and determine the domain to which the content belongs. Based on the domain, one or more entities may be selected as cross-linking keys for this piece of content. In one example, tracking number may be a cross-linking key in the package shipping domain. In another example, flight number, departure city, and departure date may be cross-linking keys in the flight domain. Once one or more cross-linking keys are identified for each piece of information in the private space 104, the cross-linking engine 542 then goes to the semi-private space 106 and the public space 108 to fetch information related to the cross-linking keys. For example, the tracking number may be used to retrieve package delivery status information from www.FedEx.com in the public space 108, and the flight number, departure city, and departure date may be used to retrieve flight status from www.UA.com in the public space 108. Information retrieved by the cross-linking engine 542 from the private space 104, semi-private space 106, and public space 108 may be stored in the private database 548, semi-private database 546, and public database 544 in the person-centric space 200, respectively. As each piece of information in the person-centric space 200 is associated with one or more cross-linking keys, they are cross-linked with other information associated with the same cross-linking keys, regardless which space it comes from. Moreover, as the cross-linking keys are identified based on the person's private data (e.g., emails), all the cross-linked information in the person-centric space 200 are relevant to the person 102.

Although only one database is shown in FIG. 5 for information from the private space 104, the semi-private space 106, or the public space 108, it is understood that information within a particular space may be organized and stored in different databases in the person-centric space 200. For instance, private data from emails, Contacts, calendars, and photos may be stored in separate databases within the private database 548; semi-private data from Facebook, Twitter, LinkedIn, etc. may be stored in separate databases within the semi-private database 546 as well. Such arrangement may enable applying different feature extraction models to different data sources, which may be helpful for the suggestion engine 504 and the person-centric knowledge retriever 526. As mentioned above, the cross-linking engine 542 continuously and dynamically maintains and updates the person-centric space 200 on a regular basis and/or in response to any triggering event. For example, any internal operation, such as query search, question answering, or task completion, may trigger the cross-linking engine 542 to update the affected data or add missing data in the person-centric space 200.

The knowledge engine 530 in this embodiment processes and analyzes the information in the person-centric space 200 to derive analytic results in order to better understand the person-centric space 200. In one embodiment, the knowledge engine 530 extracts entities from content in the person-centric space 200 and resolves them to what they refer to (i.e., can disambiguate an extracted entity when it may refer to multiple individuals). In addition to determining an entity type for an extracted entity name, the knowledge engine 530 may also determine a specific individual referred to by this entity name. The knowledge engine 530 can make use of contextual information and/or textual metadata associated with the entity name in the email to disambiguate such cases, providing a high precision resolution.

The knowledge engine 530 also builds a person-centric knowledge representation for a person 102 by extracting and associating data about the person 102 from personal data sources. The person-centric knowledge representation for the person 102 is stored in the person-centric knowledge database 532. The knowledge engine 530 can extract entities related to the person 102 and infer relationships between the entities without the person 102's explicit declaration, and create, for example, a person-centric knowledge graph for the person 102 based on the entities and relationships. The knowledge elements that can be inferred or deduced may include, for example, the person 102's social contacts, and the person 102's relationships with places, events, or other users.

Figure 6:
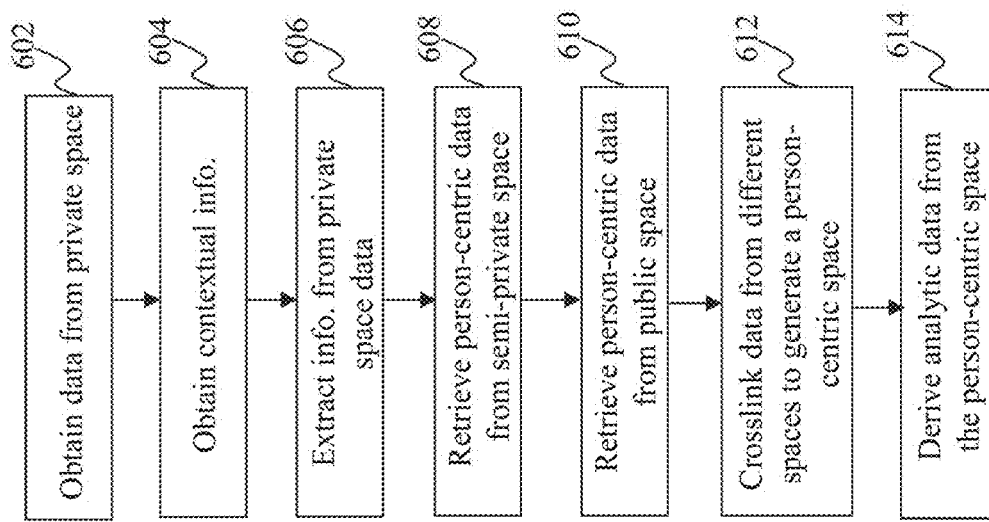
FIG. 6 is a flowchart of an exemplary process for building a person-centric space, according to an embodiment of the present teaching.

FIG. 6 is a flowchart of an exemplary process for building a person-centric space, according to an embodiment of the present teaching. Starting at 602, data from the private space 104 is obtained. The data includes any content that is private to a person, such as emails, Contacts, calendar events, photos, bookmarks, instant messages, usage records, and so on. Contextual information is obtained at 604. The contextual information includes, but is not limited to, user information such as demographic information and interests and preferences, locale information, temporal information, device information, and user-session information (e.g., other user inputs in the same or adjacent user-sessions). At 606, information from the private space data is extracted. The information may be cross-linking keys determined from entities extracted from the private space data based on the domain of the private space data and/or the obtained contextual information. Person-centric data is then retrieved from the semi-private space at 608. Similarly, person-centric data is retrieved from the public space at 610. In this embodiment, the person-centric data is retrieved based on the cross-linking keys. At 612, all pieces of person-centric data retrieved from the private space, semi-private space, and public space are cross-linked together to generate a person-centric space. In this embodiment, the cross-linking is done based on the same cross-linking keys associated with these pieces of person-centric data. At 614, analytic data is derived from the person-centric space. For example, entities may be extracted from the person-centric space and are disambiguated by the knowledge engine 530 to ascertain their extract meanings Relationships between the entities may be inferred based on information from the person-centric space by the knowledge engine 530 as well. Based on the entities and relationships, person-centric knowledge can be derived and stored in the person-centric knowledge database 532.

Figure 7:
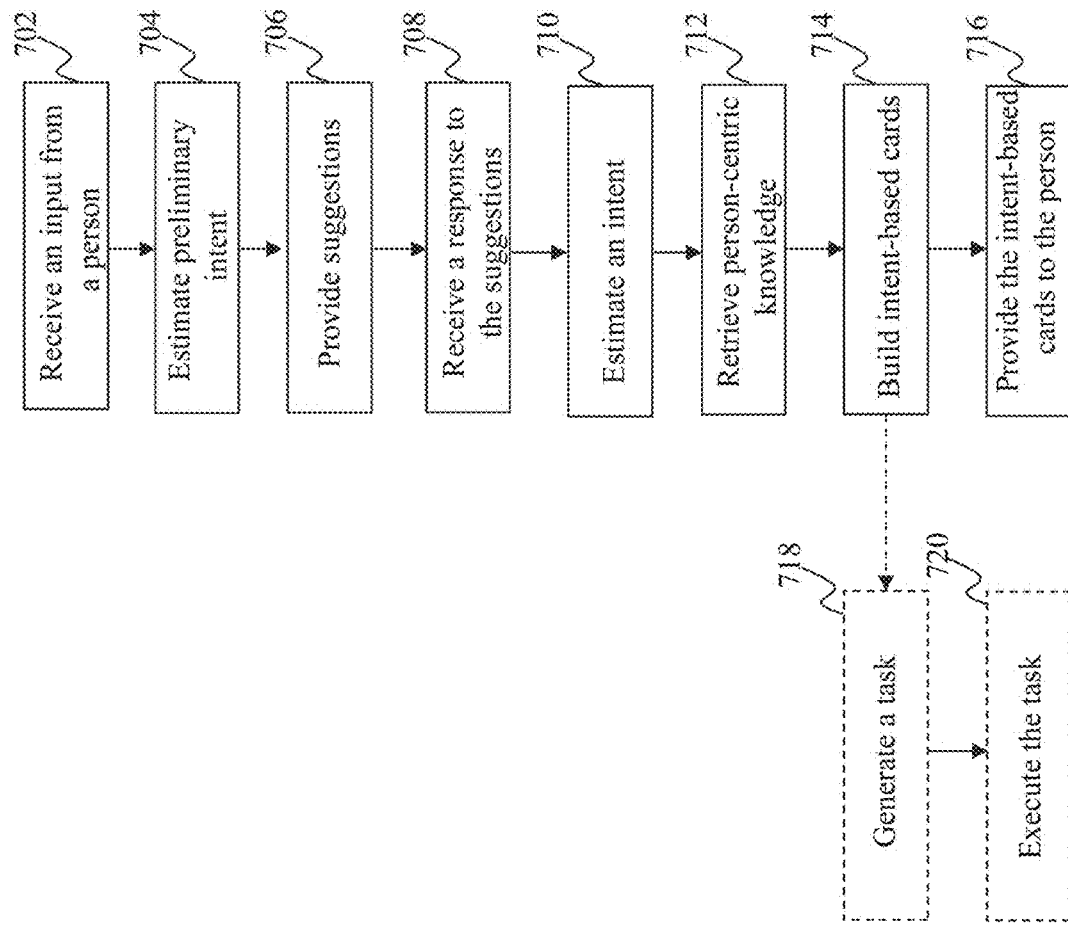
FIG. 7 is a flowchart of an exemplary process for applying a person-centric space for digital personal assistance, according to an embodiment of the present teaching.

FIG. 7 is a flowchart of an exemplary process for applying a person-centric space for digital personal assistance, according to an embodiment of the present teaching. Starting at 702, an input from a person is received. As the person enters the input, a preliminary intent is estimated and continuously updated at 704. The estimation may be based on the current input and any contextual information currently available. At 706, one or more suggestions are generated based on the current input and the estimated intent and provided to the person to assist completing the current input. A response to the suggestions is received from the person at 708. The response may be a selection of one suggestion or ignoring the suggestions and finishing the input as the person desires. Once the completed input is received, either as a selection of a suggestion or a fully-entered input, at 710, the intent is estimated again for the completed input. The intent may be estimated based on the completed input and the currently available contextual information. In some embodiments, if no input is received (e.g., when the person just logs into and has not entered anything yet), the intent may be estimated based on the contextual information alone. At 712, person-centric knowledge is retrieved based on the input. In some embodiments, the estimated intent may be used for retrieving the person-centric knowledge as well. As described above in detail, the input may be a question, a task request, or a query. In any event, entities and/or relationships may be derived from the input and are used for retrieving relevant person-centric knowledge from the person-centric knowledge database 532. In some embodiments, additional information may be retrieved from the person-centric space. Intent-based cards are built at 714. Each card may be constructed based on a layout and one or more modules that are selected based on the type of the card and the estimated intent. Content in each module may be filled in based on the person-centric knowledge and any additional information retrieved at 712. Optionally or additionally, at 718, the construction of a card may cause a task to be generated based on the estimated intent. For instance, an email card summarizing an online order confirmation email may trigger the generation of a task for automatically tracking the package delivery status. At 720, the task is executed. Nevertheless, at 716, the intent-based cards, either an email card, an answer card, a search results card, or a notice card, are provided to the person as a response to the input.

Figure 8:
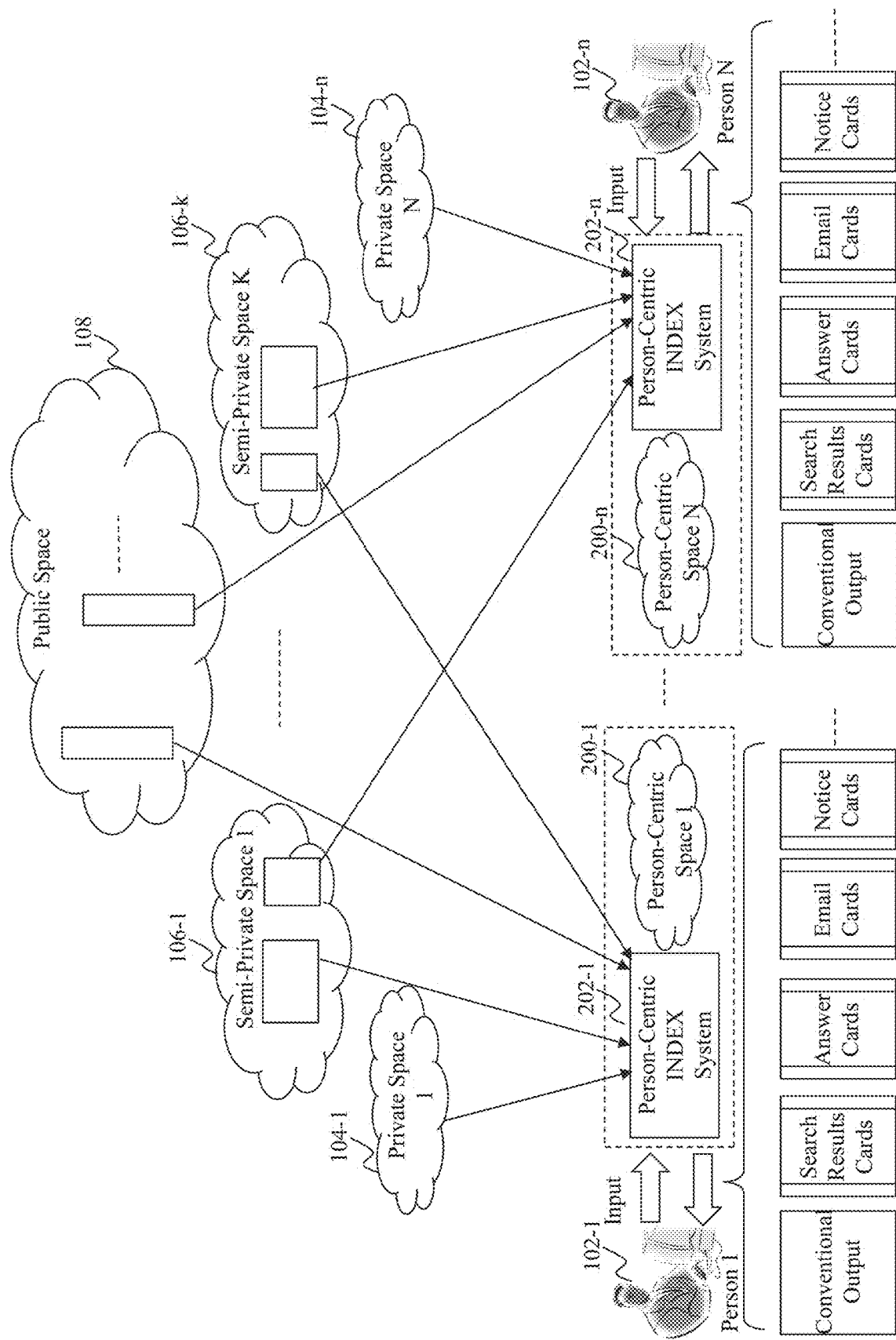
FIG. 8 depicts an exemplary scheme of building a person-centric space for each individual person via a person-centric INDEX system and applications thereof, according to an embodiment of the present teaching.

FIG. 8 depicts an exemplary scheme of building a person-centric space for each individual person via the person-centric INDEX system and applications thereof, according to an embodiment of the present teaching. In this embodiment, each person 102-1, . . . 102-n may access its own person-centric INDEX system 202-1, . . . 202-n, respectively. The person-centric INDEX system 202 may be a stand-alone system installed on each person 102-1, . . . 102-n's device, a cloud-based system shared by different persons 102-1, . . . 102-n, or a hybrid system in which some components are installed on each person 102-1, . . . 102-n's device and some components are in the cloud and shared by different persons 102-1, . . . 102-n.

In this embodiment, individual person-centric spaces 200-1, . . . 200-n are generated for each person 102-1, . . . 102-n via its own person-centric INDEX system 202-1, . . . 202-n, respectively For example, person-centric space 1 200-1 includes the projections from different spaces related to person 1 102-1 from the perspectives of person 1 102-1 (e.g., the entire private space 1 104-1, parts of the semi-private spaces 1-k 106-1, . . . 106-k that are relevant to person 1 102-1, and a slice of the public space 108 that is relevant to person 1 102-1). Each person 102-1, . . . 102-n then uses its own person-centric INDEX system 202-1, . . . 202-n to access its own person-centric space 200-1, . . . 200-n, respectively. Based on inputs from a person to its person-centric INDEX system, outputs are returned based on information from the person-centric space in any forms and styles, including, for example, any conventional outputs such as search result pages with "blue links," and any types of intent-based cards such as search results cards, answer cards, email cars, notice cards, and so on.

Figure 9:
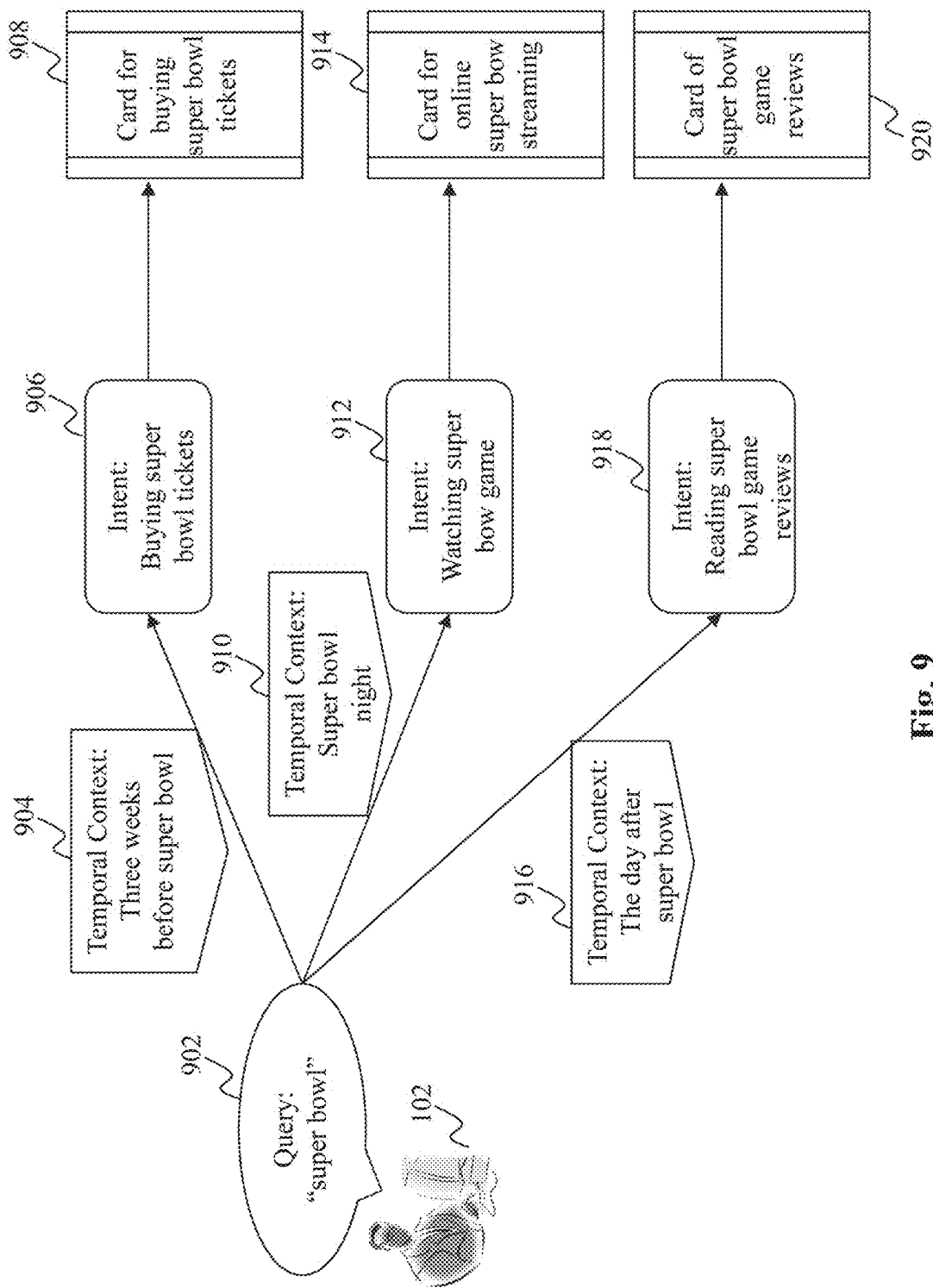
FIG. 9 depicts an exemplary scheme in which a variety of dynamic cards are built and provided to a person based on different intents estimated for the same query in different contexts, according to an embodiment of the present teaching.

FIG. 9 depicts an exemplary scheme in which a variety of dynamic cards are built and provided to a person based on different intents estimated for the same query in different contexts, according to an embodiment of the present teaching. Conventionally, a static card that has been pre-constructed for certain popular entities may be presented to a person when the query from the person happens to include one of those popular entities. In contrast, intent-based cards according to the present teaching can be dynamically generated on-the-fly by the person-centric INDEX system 202 responsive to a query 902 from the person 102. In this example, the person 102 inputs the same query 902 "super bowl" at different times. When the query 902 is entered three weeks before the super bowl game, its temporal context 904 will likely cause the intent 906 to be estimated as "buying super bowl tickets." Based on such intent, a card 908 is dynamically generated for buying super bowl tickets, including information such as super bowl ticket prices, tips on how to purchase, purchase website, etc. In some embodiments, the generation of this card 908 would cause a task of purchasing super bowl tickets to be automatically generated and completed. As time passes, when the temporal context 910 changes to the super bowl night, when the person 102 enters the same query 902, the intent 912 will likely change to "watching super bowl game." Accordingly, a different card 914 for online super bowl game streaming is built and presented to the person 102, which may include, for example, websites currently streaming the game. When the game finishes and the temporal context 916 changes to the day after the super bowl game, if the person 102 again enters the query 902, the intent 918 will likely become "reading super bowl game reviews." A card 920 of super bowl game reviews is constructed and presented to the person 102. It is understood that the examples described above are for illustrative purpose and are not intended to be limiting.

Figure 10:
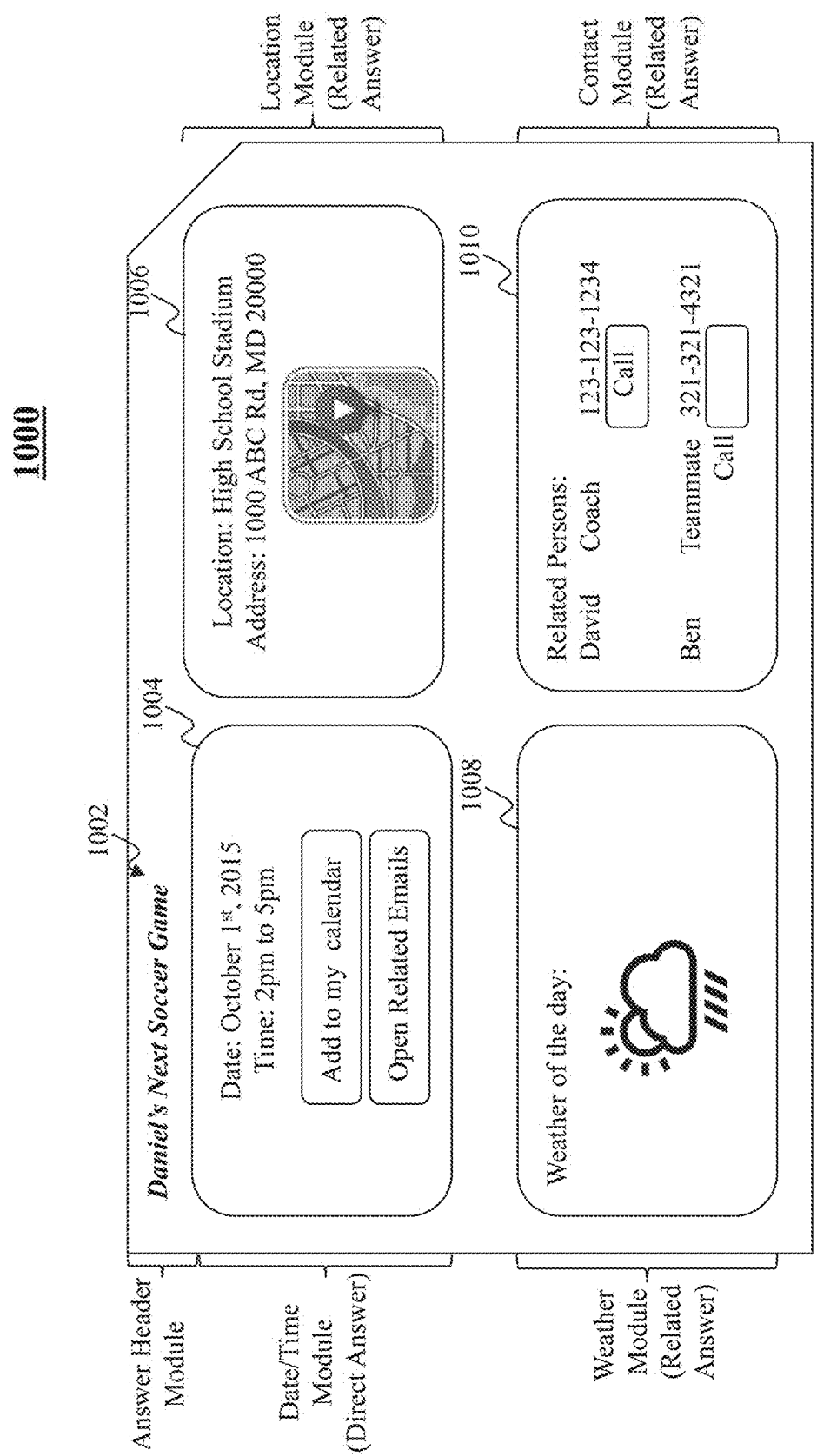
FIG. 10 illustrates an exemplary answer card, according to an embodiment of the present teaching.

FIG. 10 illustrates an exemplary answer card, according to an embodiment of the present teaching. The answer card 1000 in this example is dynamically constructed on-the-fly in response to the question "when is my son's soccer game?" Based on the type of the card (answer card) and intent (finding out my son's soccer game date/time), the layout and modules are determined as shown in FIG. 10. It is understood that the shape, size, and layout of the answer card 1000 is for illustrative purpose only and may vary in other examples. In some embodiments, the shape, size, and layout may be dynamically adjusted to fit the specification of the user device (e.g., screen size, display resolution, etc.).

In this example, the answer card includes an answer header module 1002 indicating that the topic of the answer card 1000 is "Daniel's (my son's name identified according to person-centric knowledge) Next Soccer Game." The direct answer to the question is found from a private email and provided in the date/time module 1004. Optionally, certain actions related to the answer may be provided as well, such as "add to my calendar" and "open related emails." Other information related to the direct answer is provided in other modules as well. The location module 1006 provides the location, address, and map of the soccer game. Information such as location and address may be retrieved from the email related to the game in the private database 548 of the person-centric space 200, while the map may be retrieved from Google Maps in the public space 108. The weather module 1008 provides the weather forecast of the game day, which may be retrieved from wwww.Weather.com in the public space 108. The contact module 1010 shows persons involved in the game and their contact information retrieved from the email about the game and private Contacts in the private database 548 of the person-centric space 200. Optionally, action buttons may be provided to call the persons directly from the answer card 1000. It is understood that the example described above is for illustrative purpose and are not intended to be limiting.

Figure 11:
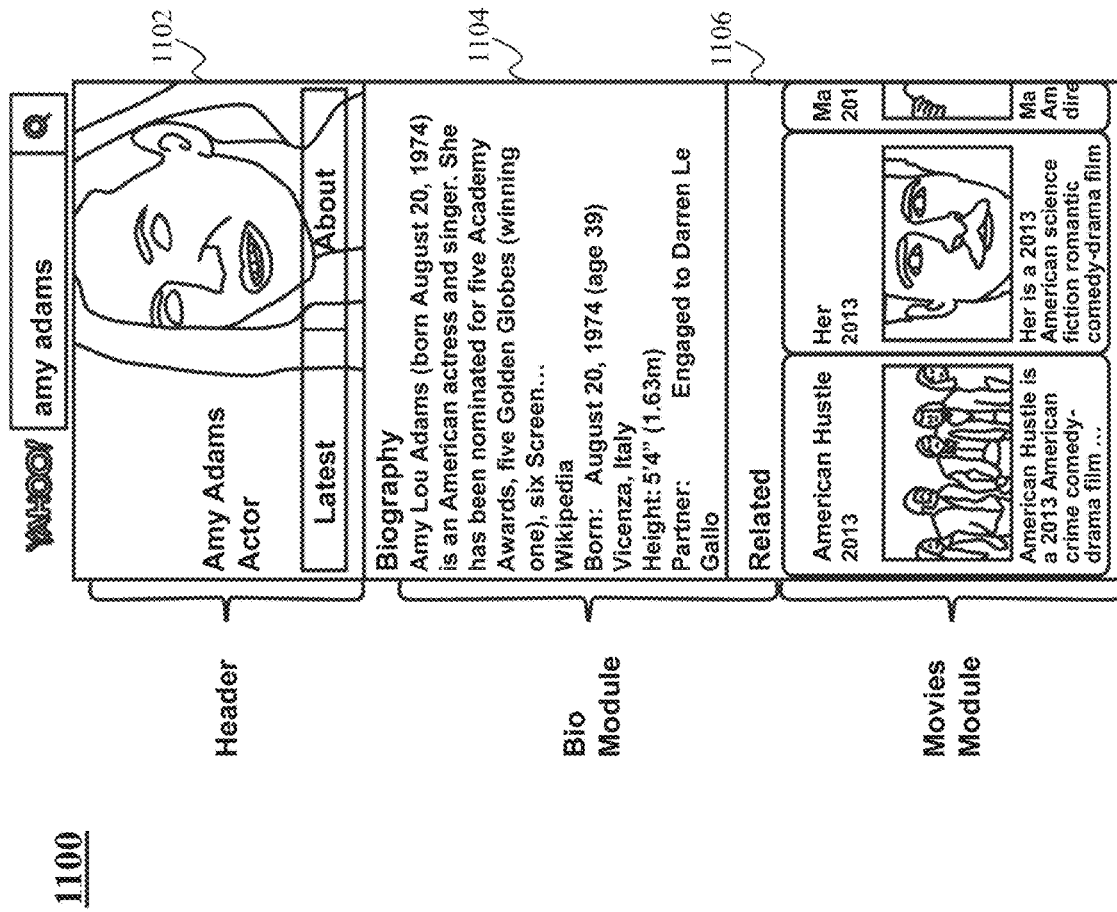
FIG. 11 illustrates an exemplary search results card, according to an embodiment of the present teaching.

FIG. 11 illustrates an exemplary search result card, according to an embodiment of the present teaching. The search results card 1100 in this example is dynamically constructed on-the-fly in response to the query "Amy Adams." Based on the type of the card (a search results card) and intent (learning more about actor Amy Adams), the layout and modules are determined as shown in FIG. 11. It is understood that the shape, size, and layout of the search results card 1100 is for illustrative purpose only and may vary in other examples. In some embodiments, the shape, size, and layout may be dynamically adjusted to fit the specification of the user device (e.g., screen size, display resolution, etc.). In this example, the search results card 1100 includes a header module 1102 with the name, occupation, and portrait of Amy Adams. The bio module 1104 includes her bio retrieved from Wikipedia, and the movies module 1106 includes her recent movies. In the movies module 1106, each movie may be presented in a "mini card" with the movie's name, release year, poster, and brief instruction, which are retrieved from www.IMDB.com. The movies module 1106 is actionable so that a person can swap the "mini cards" to see information of more her movies. If more modules cannot be shown simultaneously due to the size of the search results card 1100 (for example when it is shown on a smart phone screen), tabs (e.g., "Latest," "About") may be used to display different modules. It is understood that the example described above is for illustrative purpose and are not intended to be limiting.

Figure 12:
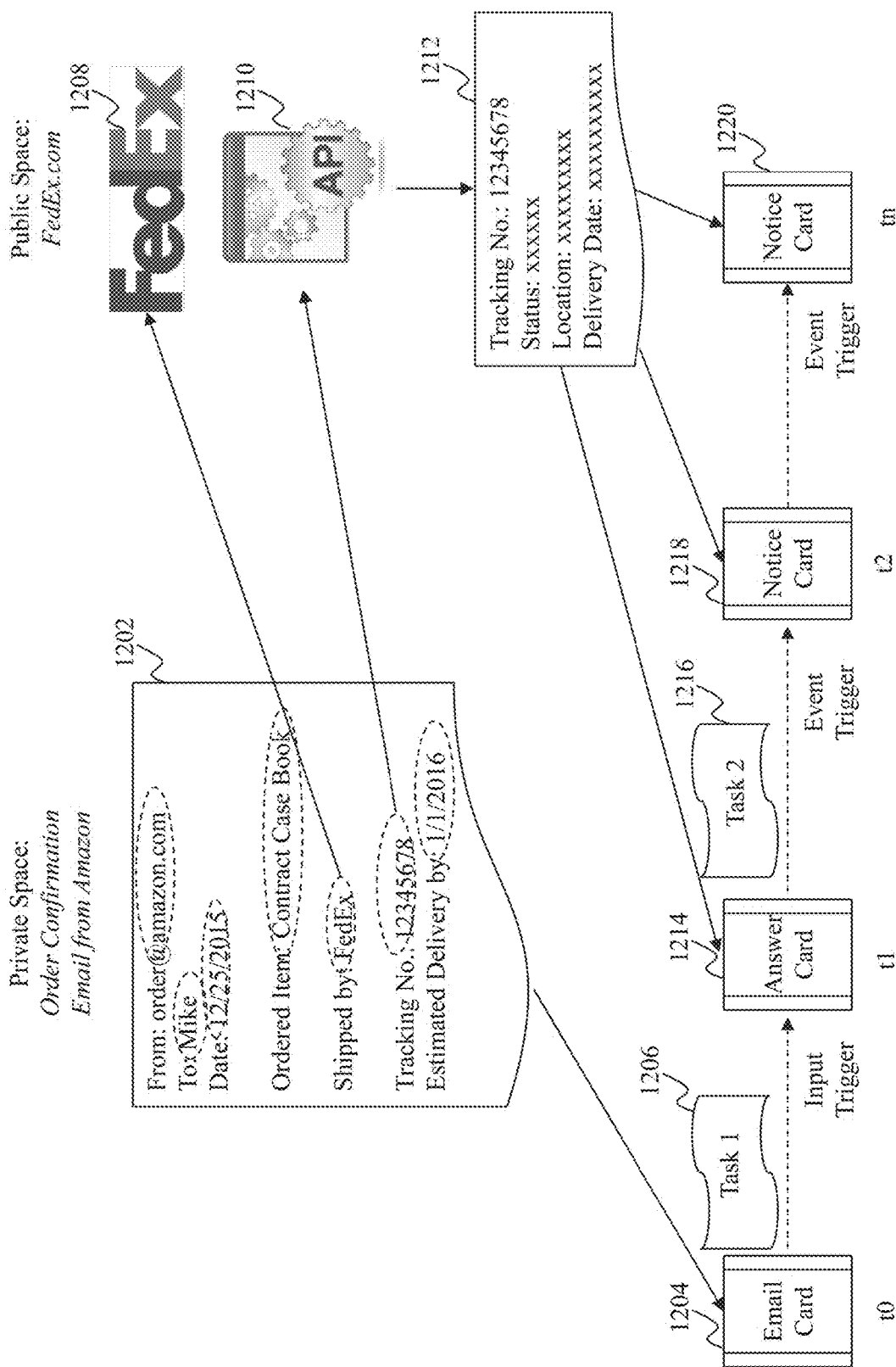
FIG. 12 depicts an exemplary scheme of automatic online order email summary and package tracking via cross-linked data in a person-centric space, according to an embodiment of the present teaching.

FIG. 12 depicts an exemplary scheme of automatic online order email summary and package tracking via cross-linked data in a person-centric space, according to an embodiment of the present teaching. Various aspects of the present teaching are illustrated in FIG. 12 as well as related FIGS. 13-15, including cross-linking data from different spaces, entity extraction and building person-centric knowledge representation, dynamic card productions based on intent, answering personal questions, and automatic task generation and completion. In this example, at time t0, an order confirmation email 1202 is received from www.Amazon.com. The email 1202 in the private space is processed to extract and identify entities. The entities include, for example, seller/vendor—www.Amazon.com, recipient/person—Mike, order date—12/25/2015, item—Contract Case book, shipping carrier—FedEx, tracking number—12345678, and estimated delivery date: 1/1/2016. In response to receiving the email 1202, an email card 1204 summarizing the email 1202 is generated and may be provided to Mike automatically or upon his request.

Figure 13:
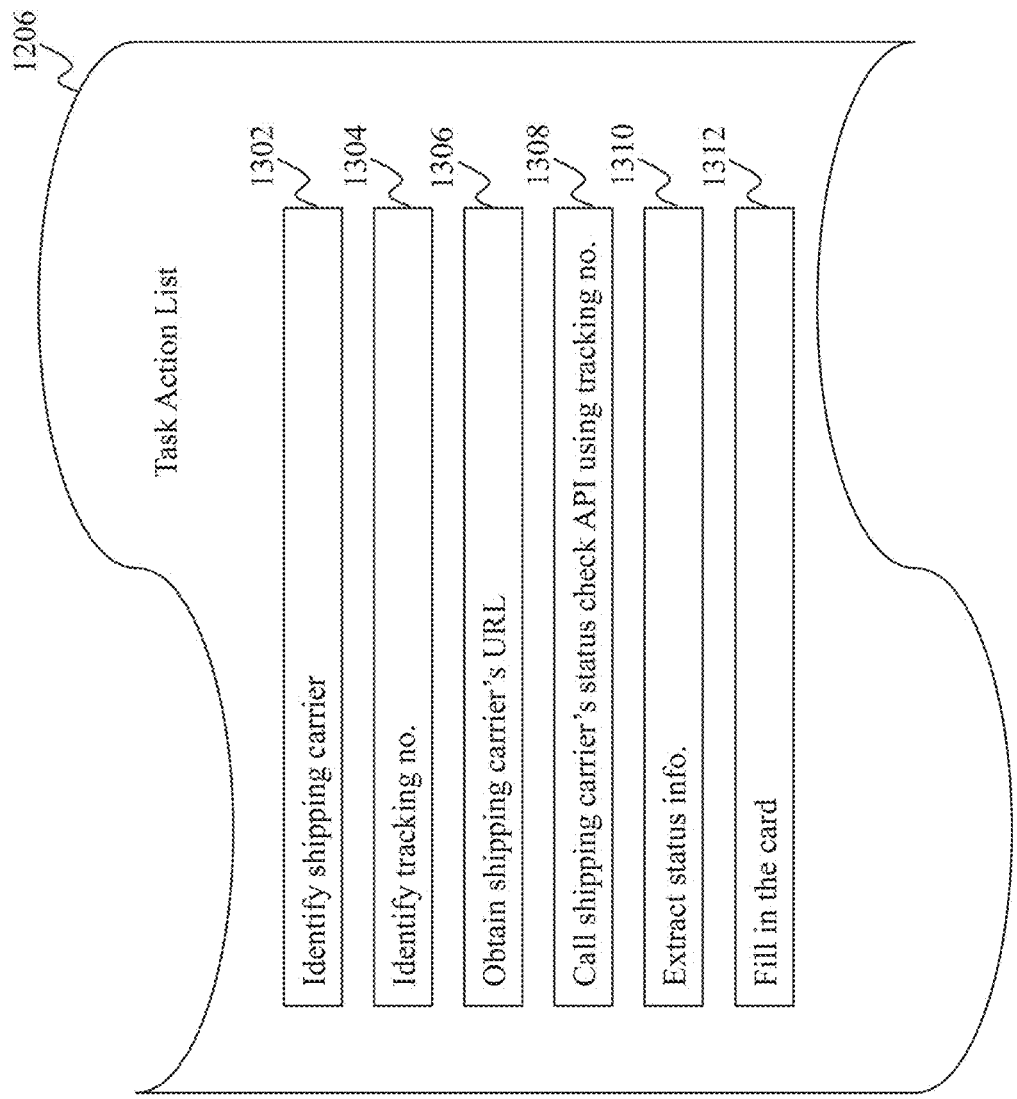
FIG. 13 illustrates an exemplary task with a list of task actions for automatic package tracking.

The generation of the email card 1204 in this example automatically initiates the generation of task 1 1206 for checking package delivery status. The details of task 1 1206 will be described in FIG. 13. In order to check the package delivery status, one or more cross-linking keys in the package shipping domain are identified among the entities extracted from the email 1202. As shown in FIG. 13, the entity "shipping carrier—FedEx" is a cross-linking key used for identifying the website of FedEx 1208 in the public space, and the entity "tracking number—12345678" is a cross-linking key used for calling the status check API 1210 of FedEx 1208. Based on the tracking number, package delivery status information 1212 is retrieved from FedEx 1208. Different pieces of information from the private space and public space are thus cross-linked based on the cross-linking keys and can be projected into the person-centric space.

At time t1, in response to an input from Mike (e.g., a question "where is my amazon order?"), an answer card 1214 is dynamically generated based on private information in the email card 1204 and the public package delivery status information 1212. The answer card 1214 is presented to Mike as an answer to his question. In this example, the generation of the answer card 1214 automatically initiates another task 2 1216 for monitoring and reporting package delivery status update. According to task 2 1216, package delivery status information 1212 may be regularly refreshed and updated according to a schedule (e.g., every two hours) or may be dynamically refreshed and updated upon detecting any event that affects the package delivery. In this example, at times t2 and tn, certain events, such as package being delayed due to severe weather or package being delivered, trigger the generation of notice cards 1218, 1220, respectively. It is understood that the example described above is for illustrative purpose and are not intended to be limiting.

FIG. 13 illustrates an exemplary task with a list of task actions for automatic package tracking Task 1 1206 for tracking package delivery status in this example includes a series of task actions (task action list): identifying shipping carrier 1302, identifying tracking number 1304, obtaining shipping carrier's URL 1306, calling shopping carrier's status check API using the tracking number 1308, extracting status information 1310, and filling in the card 1312. Each task action may be associated with parameters such as conditions in which the task action is to be executed. For example, for task action 1312 "filling in the card," the condition may be filling the current package delivery status into an answer card when a question about the package delivery status is asked by the person or filling the current package delivery status into a notice card of package delivery status update without waiting for any input from the person. Some task actions (e.g., 1302, 1304) may be executed by retrieving relevant information from the person-centric space 200 and/or the person-centric knowledge database 532, while some task actions (e.g., 1308) need to be completed in the public space 108. It is understood that the example described above is for illustrative purpose and are not intended to be limiting.

Figure 14:
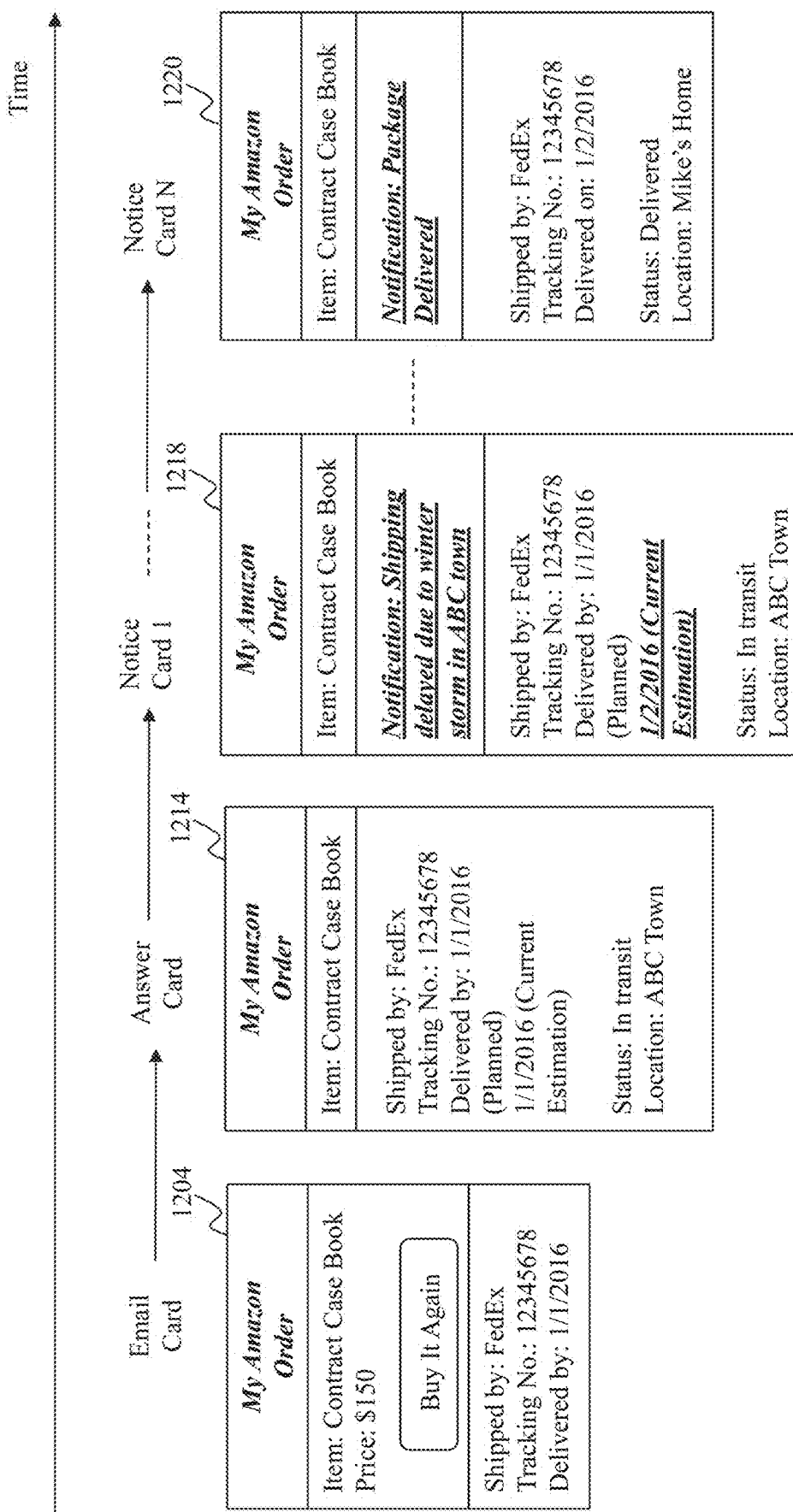
FIG. 14 illustrates a series of exemplary cards provided to a person in the process of automatic online order email summary and package tracking.

FIG. 14 illustrates a series of exemplary cards provided to a person in the process of automatic online order email summary and package tracking In this example, the email card 1204 is automatically generated responsive to receiving the amazon order confirmation email 1202 and summarizes the email 1202 based on the entities extracted from the email 1202 and relationships thereof. The email card 1204 includes a header module "My Amazon Oder" and an order module with entities of item and price. A "buy it again" action button may be added in the order module. The email card 1204 also includes a shipping module with entities of shipping carrier, tracking number, and scheduled delivery date.

In this example, the answer card 1214 is generated in response to a question from the person about the status of the package. The answer card 1214 includes the header module and order module (but with less information as the order information is not a direct answer to the question). The answer card 1214 includes a shipping module with rich information related to shipping, which is retrieved from both the private email 1202 and FedEx 1208. The information includes, for example, entities of shipping carrier, tracking number, and scheduled delivery date from the private email 1202, and current estimated delivery date, status, and location from FedEx 1208.

In this example, multiple notice cards 1218, 1220 are automatically generated in response to any event that affects the status of the package. Each notice card 1218, 1220 includes an additional notification module. If any other information is affected or updated due to the event, it may be highlighted as well to bring to the person's attention. In notice card 1 1218, shipment is delayed due to a winter storm in ABC town and as a consequence, the current estimated delivery date is changed according to information retrieved from FedEx 1208. According to notice card N 1220, the package has been delivered to Mike's home. It is understood that the examples described above are for illustrative purpose and are not intended to be limiting.

Figure 15:
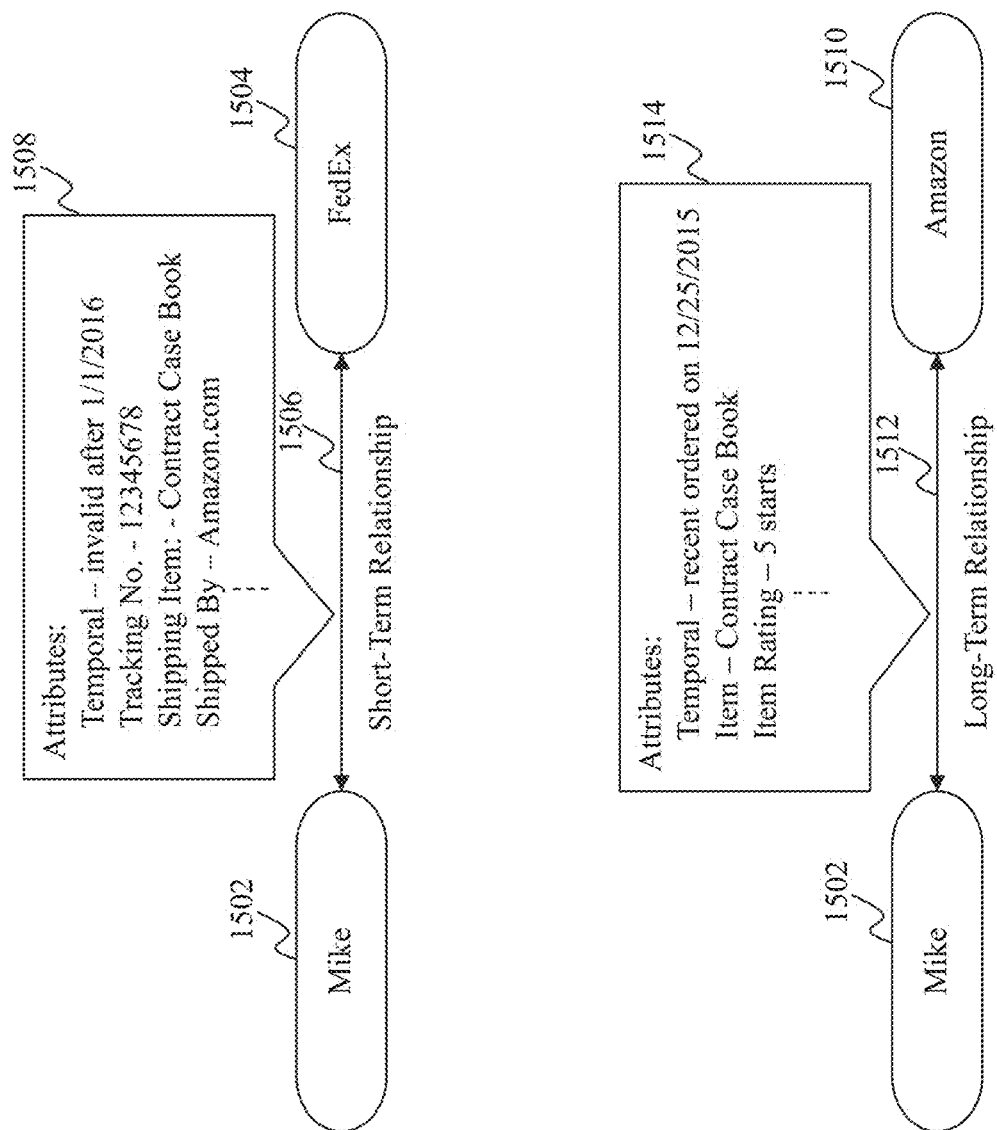
FIG. 15 illustrates exemplary entities extracted from a person-centric space and their relationships established in the process of automatic online order email summary and package tracking.

FIG. 15 illustrates exemplary entities extracted from a person-centric space and their relationships established in the process of automatic online order email summary and package tracking. As described above, the person-centric knowledge database 532 stores person-centric knowledge organized in the form of entity-relationship-entity triples. Entities extracted from the amazon order confirmation email 1202 are formed into entity-relationship-entity triples by the knowledge engine 530. In the example of FIG. 15, entity "Mike" 1502 from the recipient field of the email 1202 is determined as the person using the person-centric INDEX system 202, and entity "FedEx" 1504 is determined as a shipping carrier with a short-term relationship 1506 with entity "Mike" 1502. Attributes 1508 may be associated with the relationship 1506 including, for example, temporal attribute, tracking number, shipping item, sender, etc. These attributes may include related entities extracted from the email 1202 and any other attributes inferred based on the relationship 1506. It is noted that the relationship 1506 between entity "Mike" 1502 and entity "FedEx" 1504 is a short-term, temporary relationship in the sense that the relationship 1506 will become invalid after the shipment is completed, as indicated by the temporal attribute. In this example, entity "Mike" 1502 and another entity "Amazon" 1510 establish a long-term relationship 1512 with a different set of attributes 1514 thereof. The attributes 1514 include, for example, the temporal attribute, item, item rating, and so on. The relationship 1512 is long-term in this example because Mike has been repeatedly ordered goods from Amazon, which has become his behavior pattern or preference. It is understood that the examples described above are for illustrative purpose and are not intended to be limiting.

More detailed disclosures of various aspects of the person-centric INDEX system 202 are covered in different U.S. patent applications, entitled "Method and system for associating data from different sources to generate a person-centric space," "Method and system for searching in a person-centric space," "Methods, systems and techniques for providing search query suggestions based on non-personal data and user personal data according to availability of user personal data," "Methods, systems and techniques for personalized search query suggestions," "Methods, systems and techniques for ranking personalized and generic search query suggestions," "Method and system for entity extraction and disambiguation," "Method and system for generating a knowledge representation," "Method and system for generating a card based on intent," "Method and system for dynamically generating a card," "Method and system for updating an intent space and estimating intent based on an intent space," "Method and system for classifying a question," "Method and system for providing synthetic answers to a personal question," "Method and system for automatically generating and completing a task," "Method and system for online task exchange," "Methods, systems and techniques for blending online content from multiple disparate content sources including a personal content source or a semi-personal content source," and "Methods, systems and techniques for ranking blended content retrieved from multiple disparate content sources." The present teaching is particularly directed to providing search query suggestions, and more specifically, to providing search query suggestions to a person based on a number of data sources including person's personal data and non-personal data.

Typically, in an online content search process using a search engine, "search suggestion," "query suggestion," or "query completion" is a feature that helps persons narrow their search and/or reduce the time it takes a person to complete the inputting of the search query. For example, as a person types a search query, a list of query suggestions that have been used by other persons before are displayed to assist the person to select a desired search query (instead of typing in the whole intended query) as the input to the search engine.

However, existing search engines focus on how to discover relevant queries from query logs collected and stored based on searches conducted by a large set of persons. For example, traditional search suggestion features related to a search engine utilize the following information sources to provide a search suggestion: (1) a regular suggestion database that is generated and maintained based on mining search logs of many persons and combining other knowledge databases; (2) a particular person's search history in the past; and (3) the prefix of the query input that the particular person starts providing in the search box of the search engine. As such, query suggestions in known solutions mainly come from general persons' past search behaviors.

Existing search engines, however, do not consider a person's personal data (e.g., from a person's email, contact list, calendar events, etc.) and semi-personal data (e.g., from a person's social media accounts, etc.) to generate or determine search query suggestions as the person starts providing the query input. By ignoring a person's personal data and semi-personal data, search suggestions provided by a search engine may not be personalized, accurate, or complete for that person, and thus, the person may not have an optimal experience with the search engine.

In accordance with the various embodiments of the present disclosure, the techniques disclosed herein may be implemented as part of a search engine that is configured to provide search query suggestions to persons based on their initial (and incomplete) query input. The teachings disclosed herein relate to methods, systems, and programming for determining and providing search query suggestions to a person based on a number of data sources including the person's personal data and non-personal data. Some aspects of the present disclosure relate to processing and analyzing a person's personal and semi-personal (or "private") data from various sources to build a person corpus database, which provides relevant person information to the search query suggestion system at "run-time" (e.g., when the search query suggestion system starts processing the person's initial input).

Some other aspects of the present disclosure relate to processing person input and providing query suggestions to a person at the run-time based on the relevant person's private data from the person corpus database as well other general log-based query suggestion databases. The query suggestions are provided to the person with very low latency (e.g., less than 10 ms) in responding to the person's initial input. Further, in some embodiments, before being presented to the person, query suggestions generated using the person's private data from the person corpus database may be blended with query suggestions produced based on general log-based query suggestion databases and person history databases. Such blended query suggestions may be ranked based on various factors, such as type of content suggested (e.g., email, social media information, etc.), determined person intent based on an immediate previous query from the person, context (e.g., location, etc.) related to the person, and/or other factors.

The foregoing aspects and some other aspects of the present disclosure, which are discussed in detail below, may be used to generate query suggestions that are personalized, accurate, and complete for a specific person, and thus, may play an important role in enhancing a person's experience with the search engine.

In some embodiments, as part of the private data processing and analyzing to build person corpus database, first the private data is parsed to extract relevant keywords or key terms and other person-focused information (e.g., the person's contacts, relationships, events, etc.) from the data. Further in this process, the extracted information is aggregated within a same data source or across many data sources and ranked based on, e.g., a determined "freshness" and relevance. The extracted, aggregated and ranked person data may then be stored in a person corpus database, which is accessible to at least a part of the search engine that implements search query suggestion solutions.

Figure 16:
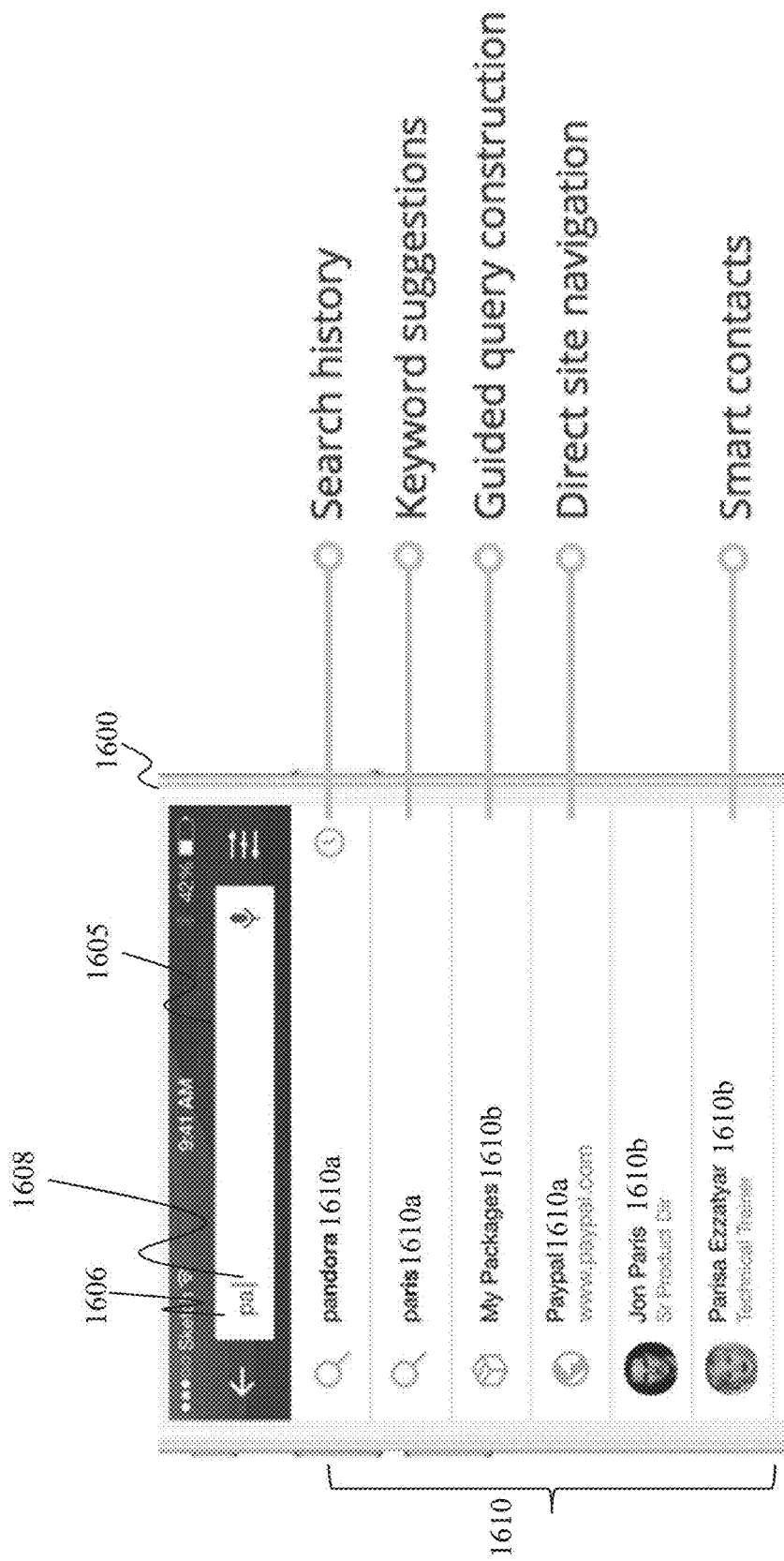
FIG. 16 illustrates a generic graphical interface for a search engine application.

FIG. 16 illustrates a generic graphical person interface 1600 for a search engine (e.g., search engine 516) depicting, among other elements, a search input bar 1605, and below the bar 1605, a list of query suggestions 1610. The graphical person interface 1600 may be similar to the person interface 502. A person 102 provides a search query input 1606 using the bar 1605, where the input may be textual, audio and/or other forms of input. The list of query suggestions 1610 is provided and displayed in the interface 1600 in response to and based on a "prefix" 1608 (e.g., letters "pa" as shown) of an intended complete search query input 1606. As will be discussed in greater detail below, the list of query suggestions 1610 may be generated based on the person's private data from a person corpus database, and public and semi-public information from general log-based query suggestion databases and person query history databases. For example, as shown in FIG. 16, in response to the person's input prefix "pa" 1608, query suggestions 1610a for "Pandora," "paris," and "Paypal" may be generated using general log-based query suggestion databases and person query history databases, and query suggestions 1610b for "My packages," "Jon Paris," and "Parissa Ezzatyar" may be generated using the person corpus database.

Figure 17:
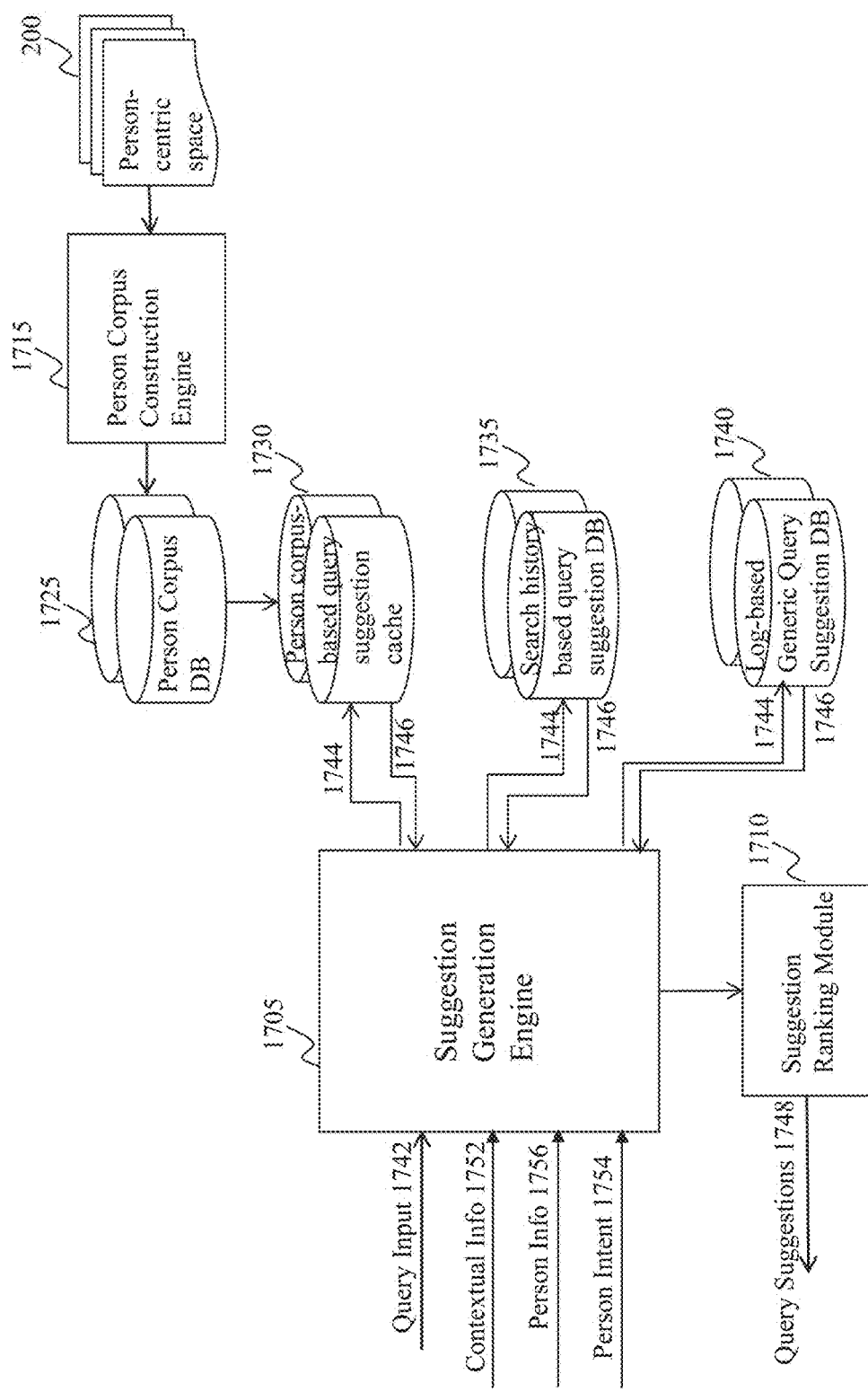
FIG. 17 is an exemplary system diagram of a system for providing search query suggestions, according to an embodiment of the present teaching.

FIG. 17 is a high-level exemplary system diagram of a system for providing search query suggestions using a person's personal data, semi-personal data, and public data, according to various embodiments of the present teaching. In one embodiment, this exemplary query suggestions system is deployed as part of the person-centric INDEX system 202, and for example, specifically as part of the person-centric knowledge retriever 526. As illustrated, in some embodiments, the query suggestions system includes a suggestion generation engine (or interchangeably referred to herein as "a suggestion retrieval engine") 1705, a suggestion-ranking module 1710, a person corpus construction engine 1715 that is operatively associated with a person-centric space 200 and a person corpus database 1725, a person corpus-based query suggestion cache module or database 1730, a search history-based query suggestion database 1735, and a log-based generic query suggestion database 1740.

The suggestion generation engine 1705 may be configured to receive person query input 1742 and, in response to the input, send requests 1744 for query suggestions to various personal and non-personal databases, e.g., databases 1730, 1735, and 1740. Based on the requests 1744, the suggestion generation engine 1705 obtains and processes query suggestions 1746 from one or more of the different databases and provides the received query suggestions to the suggestion ranking module 1710 for ranking or sorting the query suggestions before providing the ranked query suggestions 1748 to the person 102. Upon receiving the query suggestions on his/her device, the person 102 may select one of the ranked query suggestions 1748 and, in response, receive query results, e.g., a list of hyperlinks, from the search engine 516.

In some embodiments, the person query input 1742 may be received via the person interface 502, the query interface 506, and/or the Q/A interface 508, and may include a search query 1606 or a prefix 1608 of a query 1606 (i.e., the first one or more characters of a search query 1606). In addition to the person input 1742, the suggestion generation engine 1705 may also receive and process (in the context of generating or retrieving query suggestions) contextual information 1752 from contextual information identifier module 512, person intent information 1754 from intent engine 524, and other person-specific information 1756 (e.g., person's biographical information, location, etc.) from person database 514. The suggestion generation engine 1705 may utilize these additional information sets in addition to the person input 1742 when formulating requests for query suggestions from, e.g., databases 1730, 1735, and 1740.

In the context of the instant disclosure, because the query suggestions are provided to a specific person 102 based on his or her specific query input, it is assumed that the person is logged into the INDEX system 202 and/or the query suggestion system using a unique person ID for the person 102, which person ID is identified and authenticated by the system. The identified and authenticated unique person ID may be provided as part of the person input 1742, the person information 1756, and/or other inputs to the suggestion generation engine 1705. As such, based on the unique person ID, the suggestion generation engine 1705 (and other components of the query suggestion system) processes person corpus information and suggestions that are tied to that unique person ID.

In some embodiments, the search history-based query suggestion database 1735 includes high co-occurrence query pairs, which have been mined from person search query logs specific to the person 102. For example, the high co-occurrence query pairs may be mined by analyzing person sessions and collecting query pairs in a same-person session. A person session may be defined as a particular time period during which the person 102 launches a search application, interacts with the application without a dormant period of a specific time length, and either explicitly quits the application or does not interact with the application for a time length equal to or greater than the dormant period. All queries and potential contextual query pairs mined from a same-person session may then be aggregated, joined with various counts and filters, and scored with a log-likelihood ratio and other measurements. For example, the search history-based query suggestion database 1735 may include high co-occurrence query pairs <super bowl, funny ads>, <super bowl, score>, <super bowl, half-time show>, etc. In one example, given the immediate previous query "super bowl," the suggestion generation engine 1705 may fetch the query suggestion "half-time show" from the search history-based query suggestion database 1735, if a person's prefix input 1742 is "h." One example of building a search history-based query suggestion database 1735 with high co-occurrence query pairs is disclosed in U.S. Pat. No. 8,255,414, titled "SEARCH ASSIST POWERED BY SESSION ANALYSIS," which is incorporated herein by reference.

In some embodiments, the log-based generic query suggestion database 1740 includes relevant queries mined from query logs with respect to the general population of persons (i.e., a large set of persons who have interacted with the INDEX system 202 or search engine 516) without considering a specific person's current search behavior. The suggestion generation engine 1705 may request and retrieve regular query suggestions from the log-based generic query suggestion database 1740 based on only the current query prefix or person input 1742, but not the previous query (or other contextual information) in that same-person session. Some examples and details about using a contextual and regular query suggestions databases to generate relevant query suggestions are described in U.S. patent application Ser. No. 14/106,989, titled "CONTEXTUAL BASED SEARCH SUGGESTION," which is incorporated herein by reference.

Still referring to FIG. 17, the person corpus construction engine 1715 may be operatively associated with the person-centric space 200 and the person corpus database 1725, and configured to process a person's private data (e.g., emails, contacts, calendars, etc.) and semi-private data (e.g., twitter feed, social media posts, etc.) to generate query suggestions. For example, the person corpus construction engine 1715 may be configured to parse and extract specific query terms from the person's private and semi-private data in the person-centric space's databases, aggregate and rank those query terms, and store the aggregated and ranked query terms and related metadata in the person corpus database 1725. The person corpus database 1725 may be accessed directly or indirectly by the suggestion generation engine 1705 at the "run-time," i.e., at the time the suggestion generation engine 1705 starts to receive the person input 1742 (e.g., the prefix 1608 of search query input 1606). In some embodiments, the person corpus database 1725 may provide the extracted, aggregated, and ranked query terms to the person corpus-based query suggestion cache module or database 1730 for faster and direct access by the suggestion generation engine 1705 at the run-time. In some embodiments, at the run-time, based on the person input 1742, the suggestion generation engine 1705 may simultaneously access and submit query suggestion requests to all of the databases 1730, 1735, and 1740. Each of these databases may then provide their respective query suggestions 1746 to the suggestion generation engine 1705 at the same time or different times for further processing.

The suggestion generation engine 1705 may provide the received query suggestions 1746 to the suggestion-ranking module 1710 for ranking or sorting the query suggestions before providing the ranked query suggestions 1748 to the person 102. The suggestion ranking-module 1710 may rank the suggestions 1746 from different data sources (i.e., associated with the personalized suggestion database 1730 and the non-personalized suggestion databases 1735, 1740) based on various factors including, but not limited to:

(a) data source usage—for example, if the person 102 is a heavy user of Facebook as indicated by information from the person-centric space 200 (i.e., the person 102 logs into and interacts with the Facebook application more than a certain number of times in a day and for more than a certain time period in each logged-in session), the query suggestions extracted and processed based on the person's data from Facebook may be ranked higher than the query suggestions based on the person's other less-accessed social network data sources;

(b) data source freshness—for example, if the person-centric space 200 indicates that, in the email data source, the person 102 has a new email from a very close friend or family member (who is registered as such in the person's contact information in the person-centric space 200), the query suggestions extracted and processed based on this email may be ranked higher than the query suggestions based on the emails to the person 102 from unknown entities (i.e., entities that are not registered in the person 102's contact information);

(c) click, view, and/or conversion statistics on different data sources—for example, based on the number of times the person 102 clicks on, views, and performs other interactions with emails or tweets from (or related to) a specific pre-identified entity, the query suggestions extracted and processed based on those emails or tweets may be ranked higher than the query suggestions based on emails or tweets from (or related to) other entities; and (d) person 102's location and time (and other contextual information)—for example, query suggestions related to certain upcoming events (e.g., Super Bowl) may be ranked higher than other possible query suggestions when any of those certain events relate to the person's location (e.g., the city or venue of the Super Bowl) and day/time (e.g., the date and time of Super Bowl Sunday), as indicated in information 1752 or 1756.

The suggestion-ranking module 1710 may rank the query suggestions 1746 based on one or more of the criteria discussed above using one or more machine-learning techniques. A machine-learning model implemented with the suggestion-ranking module 1710 may generate a ranking score for each query suggestion based on a person's contextual information 1752 and other person information 1756, as well as query terms' historical information. The machine-learning model may be a rule-based machine-leaning model or a probabilistic machine-leaning model. The suggestion-ranking module 1710 may provide the ranked query suggestions 1748 to the person 102 via the interface 502. Upon receiving the query suggestions on his/her device, the person 102 may select one of the ranked query suggestions 1748 and, in response, receive query results, e.g., a list of hyperlinks, from the search engine 516.

Figure 18:
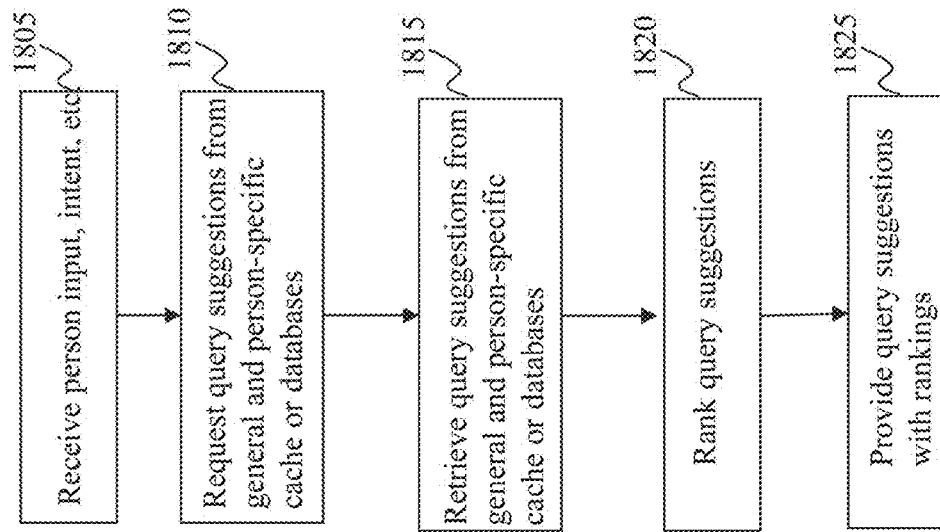
FIG. 18 depicts an exemplary process to provide query suggestions, according to an embodiment of the present teaching.

FIG. 18 is a flowchart of an exemplary process operated or performed at a query suggestion system to provide query suggestions, according to an embodiment of the present disclosure. Starting at 1805, query input (e.g., at least a prefix of a complete search query) is received from the person 102. In the same operation, other inputs such as the person's intent, the person's contextual information, and other person-specific information are received. At 1810, based on the received query-related inputs and person-related inputs, requests for query suggestions are sent to various different query suggestion databases including personalized databases that relate to the person's private and semi-private data and non-personalized databases that relate to public or general users' data. At 1815, responsive to the requests, query suggestions from these different data sources are retrieved and received. At 1820, the received query suggestions are ranked and assigned a rank score according to one or more predefined factors (discussed above), e.g., using a machine learning model. At 1825, the ranked query suggestions and, optionally, associated rankings are provided to the person 102 who entered or started entering the query. The person 102 may select one of the ranked query suggestions and, in response, receive query results, e.g., a list of hyperlinks, from the search engine 516.

Figure 19:
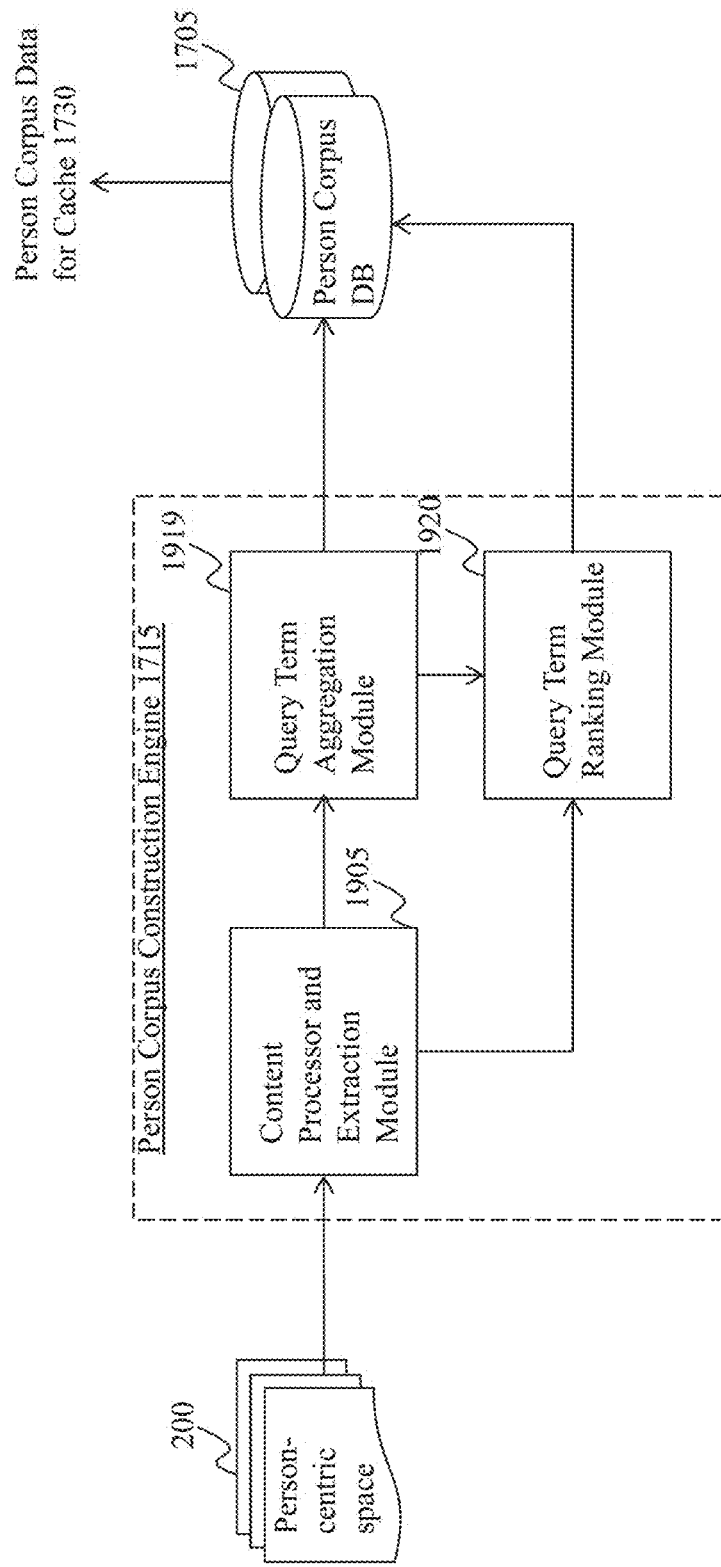
FIG. 19 is an exemplary system diagram of an person corpus construction engine, according to an embodiment of the present teaching.

FIG. 19 is an exemplary system diagram of the person corpus construction engine 1715, according to an embodiment of the present teaching. As illustrated, the person corpus construction engine 1715 may include a content processor and extraction module 1905, a query term aggregation module 1919, and a query term-ranking module 1920. The content processor and extraction module 1905 may be configured to be operatively associated with the person-centric space 200 such that the module 1905 receives as input content from various databases (e.g., private database 548, semi-private database 546, etc.) of the person-centric space 200. In one embodiment, the content processor and extraction module 1905 parses the content received from the person-centric space 200 and extracts "queryable" terms (i.e., the terms that may be included in a search query input) from the content. The content processor and extraction module 1905 may be configured to parse the content and extract queryable terms on a continuous real-time basis (i.e., perform the parsing and extraction as soon as there is a notification that some new content is being added to the person-centric space 200). Alternatively, the content processor and extraction module 1905 may be configured to parse the content and extract queryable terms only at certain predefined intervals.

Based on the type of content source in the person-centric space 200 with which the content processor and extraction module 1905 is communicating, the queryable terms that may be extracted include, but are not limited to:

(a) contacts indicated in an email, for example, email sender or receivers;

(b) important or relevant keywords inside a document or email, for example, the term "benzene release" in an email subject line: "Re: Benzene Release Announcement 8/13;"

(c) entities, for example, "order" in an email from Amazon: "Part of your order has shipped!"; and (d) events, for example, "lunch at Dishdash this Friday" in email from a friend.

Figure 20:
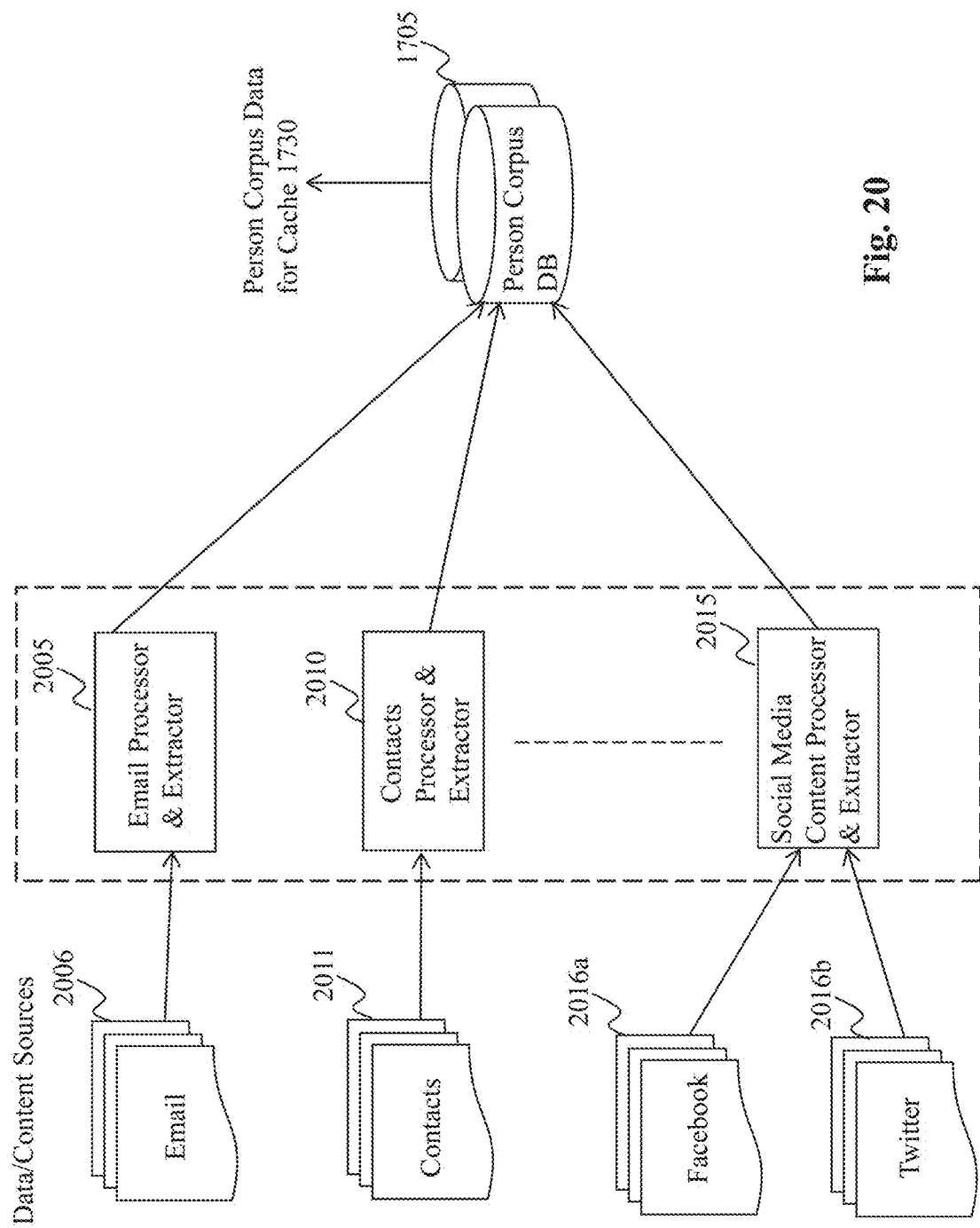
FIG. 20 illustrates content-specific extraction modules, according to an embodiment of the present teaching.

Similarly, the content processor and extraction module 1905 may extract queryable terms from other data sources, e.g., Twitter or Facebook content associated with the person 102. The content processor and extraction module 1905 may utilize one or more of rule-based extracting techniques, machine learning-based extracting techniques, or even manual selection-based extracting techniques. In some embodiments, the content processor and extraction module 1905 includes two types of modules—a general module (not shown) and content-specific modules (shown in FIG. 20). The general module may process content from the person-centric space 200 regardless of the type of content or the type of content source and utilize common term-extracting methods, such as Natural Language Processing (NLP) techniques (Named Entity Recognizer (NER), Part of Speech (POS), Grammar Analysis, etc.), to extract general queryable terms (e.g., a term from an email's subject line).

Each special module, however, may be configured to process content and extract queryable terms that relate to one or more specific types of content or types of content sources. For example, referring to FIG. 20, an email processor and extractor special module 2005 may be operatively associated with email data sources 2006 in the person-centric space 200 and may process the emails to extract different email addresses (sender's email address, recipient's email address, cc email address, etc.) from each email as the queryable terms. Similarly, a contact processor and extractor special module 2010 may be operatively associated with contacts data sources 2011 in the person-centric space 200 and may process the contact cards to extract last names and cities of the entity/entities from each contact card as the queryable terms. Further, a social media content processor and extractor special module 2015 may be operatively associated with social network (Twitter, Facebook) data sources in the person-centric space 200 and may process the person's Twitter feed and/or Facebook Newsfeed to respectively extract hashtag and "like" information as the queryable terms.

In addition to extracting queryable terms, each special module of the content processor and extraction module 1905 may also be configured to extract one or more attributes associated with each content item and/or each queryable term. For example, the email processor and extractor special module 2005, when processing and extracting terms from an email, may also determine various attributes associated with the email including, but not limited to:
- is_in_cc: yes
- e_mail_id: 134
- person_num_in_cc: 5
- in_cc_order: 1
- timestamp: 13232323

Referring back to FIG. 19, the query term aggregation module 1919 may be configured to receive the queryable terms extracted from person-specific data from various different data sources, aggregate or consolidate the queryable terms with respect to a same data source (for example, aggregate all queryable terms extracted from an email data source), and/or aggregate or consolidate each queryable term across different data sources (for example, aggregate a single term found in both email data and Twitter data, etc.). As part of the query term aggregation, the query term aggregation module 1919 is configured to map, for each queryable term, the associated attributes onto a few features within a common feature space. In this way, disparate attributes related to different content are normalized over a common feature space. These (normalized) features may be used (e.g., compared) by query term-ranking module 1920 to rank the extracted queryable terms or by suggestion-ranking module 1710 to rank query suggestions that are to be presented to the person 102. For example, values of the features of a queryable term may indicate how important that term is with respect to its data source or among different data sources, how frequently that term appears in content from one specific data source or various different data sources, or how recently that term has appeared in content from one specific data source or various different data sources.

Figure 21:
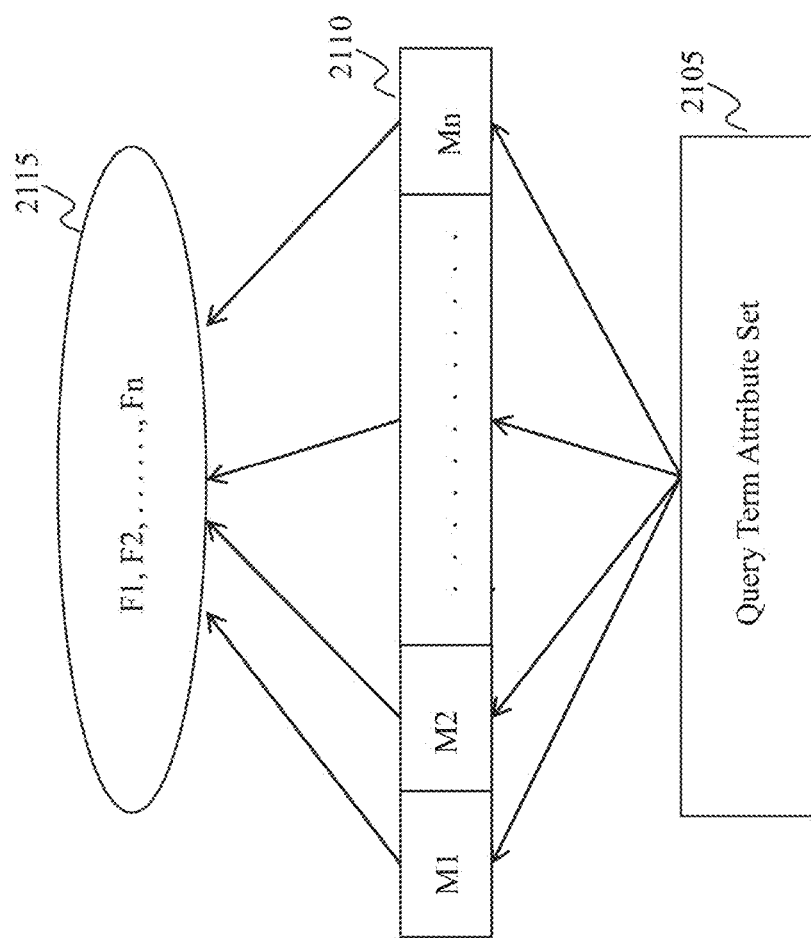
FIG. 21 illustrates a technique of mapping queryable terms to a feature set, according to an embodiment of the present teaching.

An example of mapping queryable terms to features is illustrated in FIG. 21. In the illustrated embodiment, an attribute set 2105 of a queryable term is provided as an input to each of multiple feature generation or mapping methods 2110 Mi (i=1, 2, . . . , n), where each method 2110 Mi corresponds to one feature Fi (i=1, 2 . . . , n) of the common feature space 2115. Each method 2110 may be a rule-based linear combination process or a probabilistic model that is trained from a training data set, which method is used to convert the attribute set 2105 into one of the features Fi.

Referring back to FIG. 19, the query term-ranking module 1920 may receive as inputs the queryable terms from the content processor and extraction module 1905 and features related to each of the queryable terms from the query term aggregation module 1919. The query term-ranking module 1920 may then rank the queryable terms in accordance with the importance of content related to each queryable term within the content's respective data source and/or among different data sources, frequency of each queryable term within the related content, recentness of each queryable term within the related content, etc. For example, with respect to queryable terms extracted from email content of the person 102, the query term-ranking module 1920 may rank the each of those queryable terms based on the importance of the email itself in terms of whether the email address of the person 102 is listed in the "To" field or the "Cc" field of the email. If the person 102 is listed on the "To" field of the email, that email is assigned higher importance, and the related queryable term is assigned a higher rank by the query term-ranking module 1920. Conversely, if the person 102 is listed on the "Cc" field of the email, that email is considered to be of lower importance, and the related queryable term is assigned a lower rank by the query term ranking module 1920. Another factor that may determine the importance of the email is based on whether the email at issue is at the late end of the email conversation/thread or toward the beginning of the email conversation/thread. Another feature that the query term-ranking module 1920 may consider for ranking queryable terms related to email content is email readiness. For example, a queryable term obtained from an email that was saved into a folder or was marked as "high priority" is assigned higher ranking than terms from other emails.

The aggregated queryable terms, corresponding features, and corresponding ranking values are respectively provided from the query term aggregation module 1919 and the query term-ranking module 1920 to person corpus database 1725 for storage and access by the suggestion generation engine 1705, the cache module 1730, etc.

Figure 22:
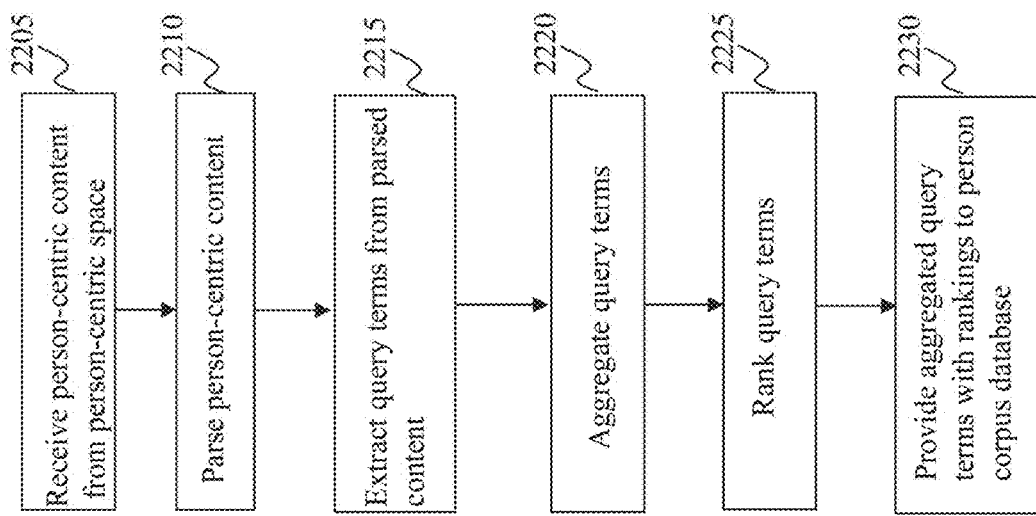
FIG. 22 depicts an exemplary process to construct person corpus database, according to an embodiment of the present teaching.

FIG. 22 is a flowchart of an exemplary process operated or performed at the person corpus construction engine 1715, according to an embodiment of the present disclosure. Starting at 2205, content from various databases (e.g., private database 548, semi-private database 546, etc.) of the person-centric space 200 is received, e.g., at the module 1905, and at 2210, the content is parsed by the module 1905, e.g., according to one or more text-parsing techniques. At 2215, queryable terms and related attributes are extracted from the parsed content by the module 1905. At 2220, the queryable terms and corresponding attributes are aggregated and related features are generated, e.g., by the module 1919. At 2225, the queryable terms are ranked based on their feature values by the module 1920. At 2230, the aggregated queryable terms, their feature values, and their corresponding rankings are provided for storage at the person corpus database 1725.

Figure 23:
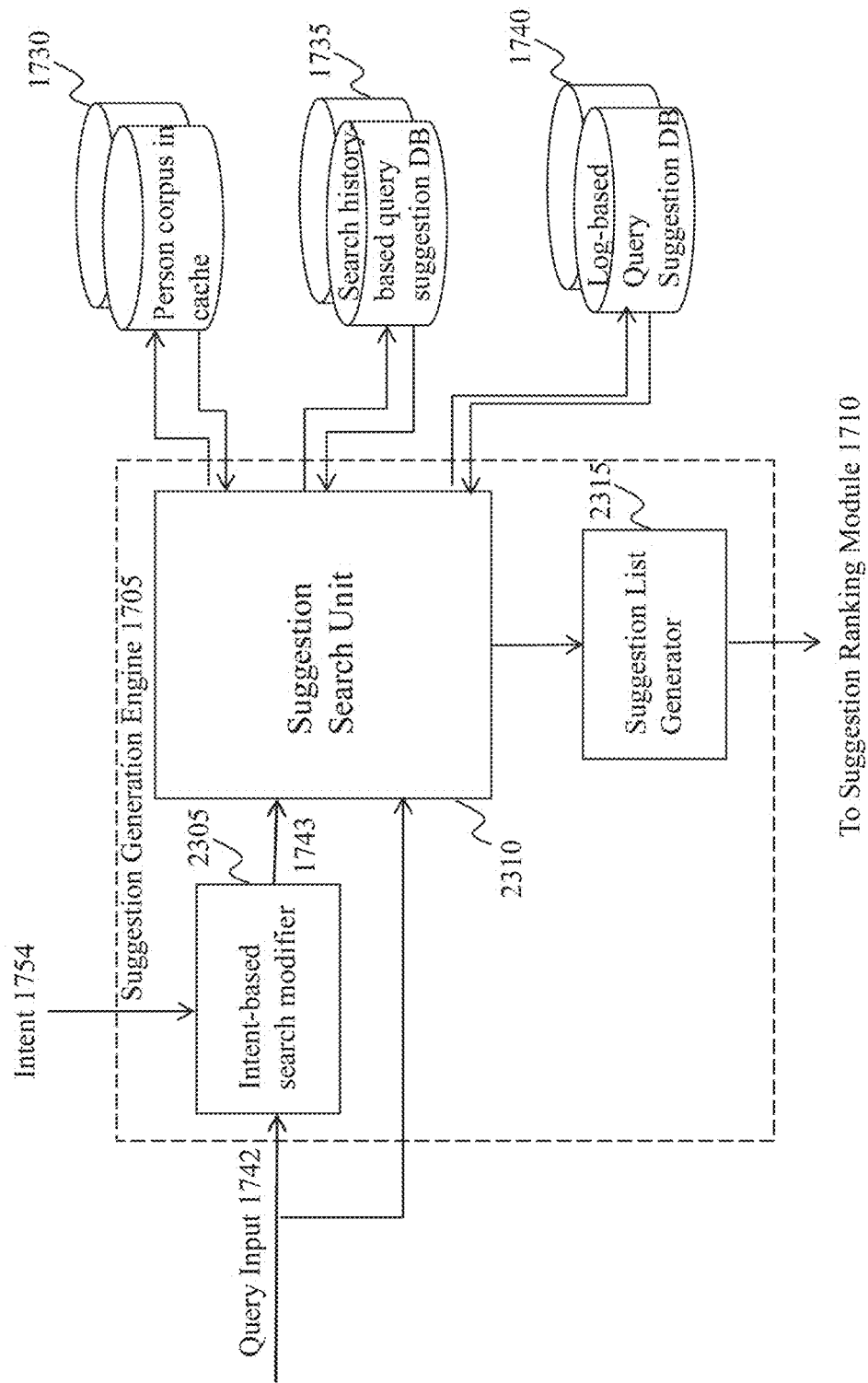
FIG. 23 is an exemplary system diagram of a suggestion generation engine, in accordance with an embodiment of the present teaching.

FIG. 23 is an exemplary system diagram of the suggestion generation engine 1705, in accordance with an embodiment of the present teaching. As illustrated, the suggestion generation engine 1715 may include an intent-based search modifier 2305, a suggestion search unit 2310, and a suggestion list generator 2315. The intent-based search modifier 2305 may receive the query input 1742 and the intent 1754 of the person 102 (from the intent engine 524) and modify the query input 1742 based on the intent 1754. For example, if the query input 1742 is the word "super" and the intent 1754 is directed to queries regarding the upcoming Super Bowl game, the intent-based search modifier 2305 may modify the query input "super" 1742 to form another query 1743 "super bowl." Both the original query input 1742 and the modified query input 1743 are provided as inputs to the suggestion search unit 2310, which processes these query inputs to determine the types of personalized and non-personalized query suggestions that may be applicable to the query/queries and, accordingly, generate requests to search for the relevant type of query suggestions in various different query suggestion databases 1730, 1735, and 1740. The suggestion search unit 2310 may receive query suggestions from the personalized and non-personalized databases based on the requests, blend the query suggestions, and provide the blended query suggestions to the suggestion list generator 2315, which may sort the query suggestions in a list form to provide to the suggestion-ranking module 1710.

Figure 24:
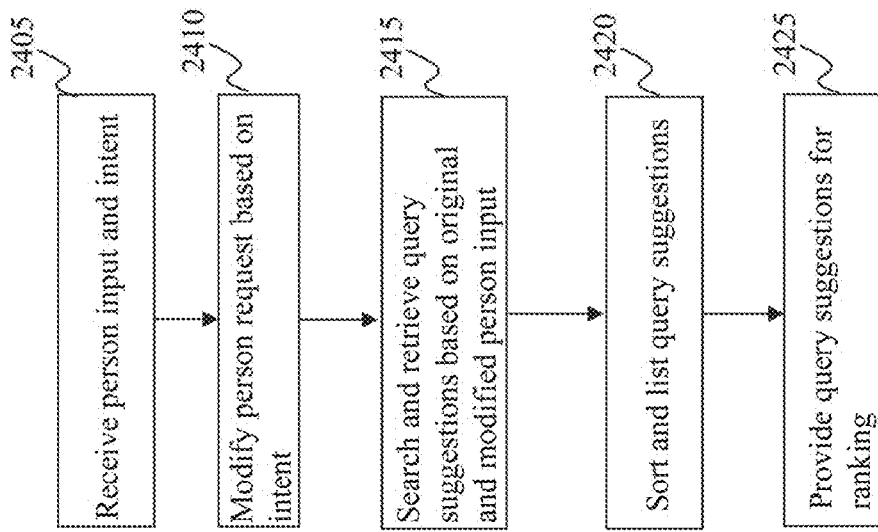
FIG. 24 depicts an exemplary process to generate query suggestions, according to an embodiment of the present teaching.
Figure 25:
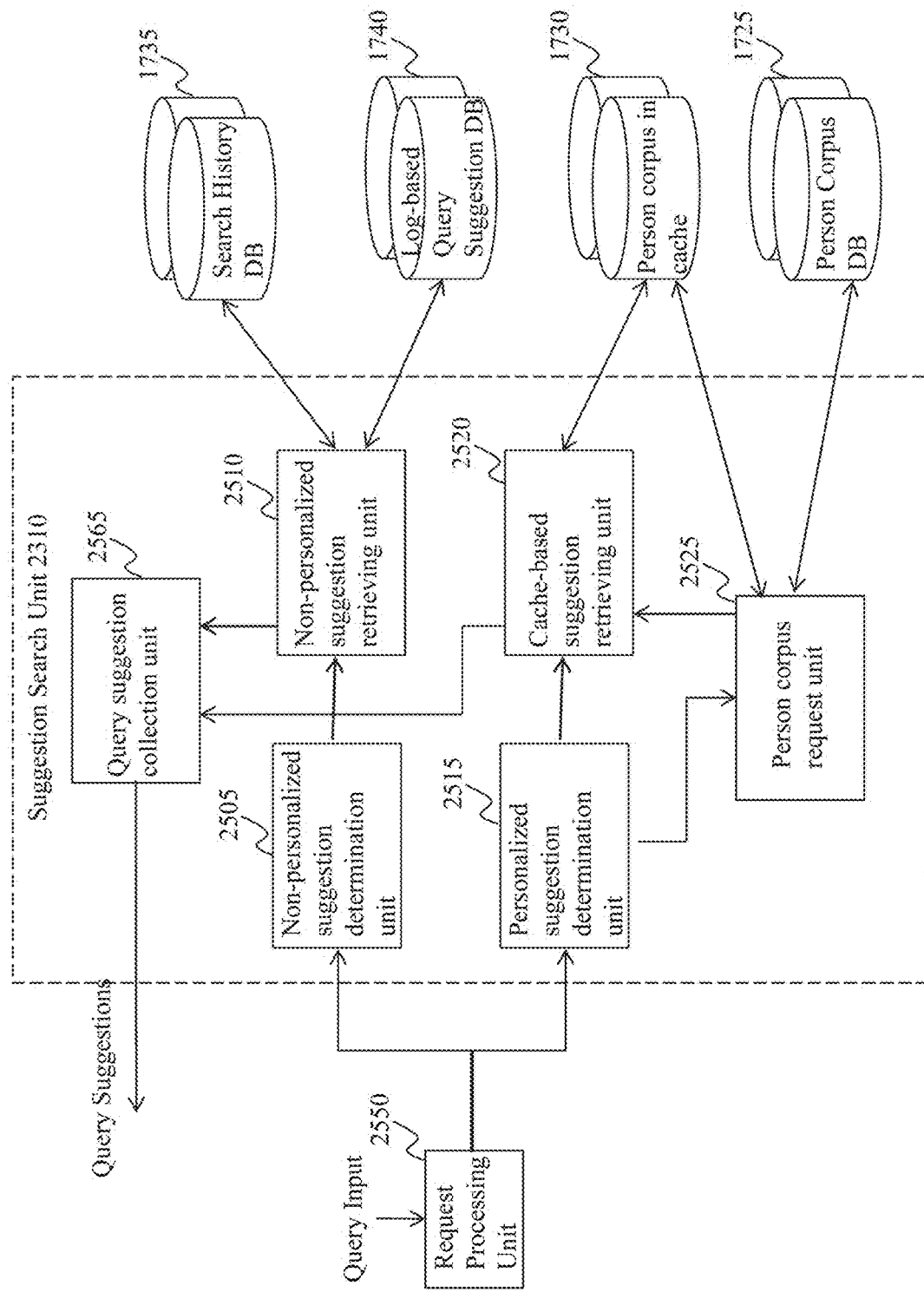
FIG. 25 is an exemplary system diagram of a suggestion search unit, according to an embodiment of the present teaching.

FIG. 24 is a flowchart of an exemplary process operated or performed at the suggestion generation engine 1705, according to an embodiment of the present disclosure. Starting at 2405, query input and intent are received, e.g., at the intent-based search modifier 2305, and at 2410, the query input is modified by the intent-based search modifier 2305 according to the received intent to generate a modified query input. At 2415, the original query input and the modified query input are provided as inputs to the suggestion search unit 2310. In the same operation, these query inputs are processed to determine the types of personalized and non-personalized query suggestions that may be applicable to the query/queries and, accordingly, generate requests to search for the relevant type of query suggestions in various different query suggestion databases 1730, 1735, and 1740. The relevant query suggestions are received from the personalized and non-personalized databases based on the requests, and at 2420, the query suggestions may be sorted and put in a list form. At 2425, the list of query suggestions is provided to the suggestion-ranking module 1710 for ranking FIG. 25 is an exemplary system diagram of the suggestion search unit 2310, according to an embodiment of the present teaching. As illustrated, the suggestion search unit 2310 may include a non-personalized suggestion determination unit 2505, a non-personalized suggestion retrieving unit 2510, a personalized suggestion determination unit 2515, a personalized/cache suggestion-retrieving unit 2520, a person corpus request module 2525, and a query suggestion collection module 2565. In one embodiment, a request processing unit 2550 receives the query input 1742 and/or the modified query input 1743 and provides the query input(s) to the suggestion search unit 2310, specifically to the non-personalized suggestion determination unit 2505 and the personalized suggestion determination unit 2515. Both of the non-personalized suggestion determination unit 2505 and the personalized suggestion determination unit 2515 may process the query input(s) to determine types of the non-personalized and personalized query suggestions that need to be searched and retrieved from various databases. For example, the non-personalized suggestion determination unit 2505 may determine a category of query suggestions (e.g., query suggestions related to famous people, cities, cultures, current events, etc.) to request and obtain from the non-personalized suggestion databases 1735 and 1740. Further, the personalized suggestion determination unit 2515 may determine a category of query suggestions (e.g., query suggestions related to personal and semi-personal data such as emails, Twitter, Facebook, calendar, etc.) to request and obtain from the personalized suggestion databases, e.g., the person corpus cache 1730 that receives personalized query suggestions and their rankings from the person corpus database 1725.

The non-personalized suggestion determination unit 2505 and the personalized suggestion determination unit 2515 may provide their respective determinations about the type or category of query suggestions to request and retrieve, as well as the query input(s), to the non-personalized suggestion retrieving unit 2510 and the personalized suggestion retrieving unit 2520, respectively. The non-personalized suggestion-retrieving unit 2510 and the personalized suggestion-retrieving unit 2520 prepare specific requests for query suggestions based on the received query input(s) and the determined relevant types of the intended query suggestions. The non-personalized suggestion-retrieving unit 2510 may submit the requests to the non-personalized suggestion databases 1735 and 1740, which, responsive to the requests, return one or more non-personalized query suggestions to the non-personalized suggestion-retrieving unit 2510. Similarly, the personalized suggestion-retrieving unit 2520 may submit the requests to the personalized cache 1730, which, responsive to the requests, returns one or more personalized query suggestions (if available) to the personalized suggestion-retrieving unit 2520. Both the personalized and non-personalized query suggestions from the units 2510 and 2520 are provided to the query suggestion collection module 2565, which collects the query suggestions and provides them to the suggestion list generator 2315.

In some embodiments, the personalized cache module 1730 does not have the personalized query suggestions to fulfill the request sent by the personalized suggestion-retrieving unit 2520. In these cases, the personalized suggestion determination unit 2515 may send the determinations about the type or category of intended personalized query suggestions and the query input(s) to the person corpus request module 2525. The person corpus request module 2525 may generate a request for the intended personalized query suggestions and send the request to the person corpus database 1725, which, responsive to the request, returns one or more personalized query suggestions to the person corpus request module 2525. The person corpus request module 2525 may store the personalized query suggestions into the personalized cache 1730 and may notify the personalized suggestion-retrieving unit 2520 that the personalized cache 1730 has been populated with the relevant query suggestions. In a subsequent time instance, when the person 102 further provides additional query input (e.g., types in one or more characters in addition to the initial query prefix characters), among other operations of the suggestion search unit 2310 discussed above, a new request for personalized query suggestions is generated by the personalized suggestion-retrieving unit 2520 and sent to the personalized cache 1730. At this time, having previously received the relevant query suggestions from the person corpus request module 2525, the personalized cache 1730 may likely fulfill the new request and return the relevant personalized query suggestions to the person corpus request module 2525 for further processing by the query suggestion collection module 2565 (as discussed above).

In some embodiments, in the case where the personalized cache 1730 does not have the requested personalized query suggestions, the time taken by the person corpus request module 2525 to fetch and provide the personalized query suggestions from the person corpus database 1725 may be much longer than an acceptable time threshold predefined for the query suggestion system. As such, it may not be acceptable for the query suggestion system to wait for the query suggestions to be fetched from the personalized cache 1730 and provided to the person 102. Accordingly, in order to keep the overall latency consistently low for the query suggestion system, when the cache 1730 fails to provide the suggestions for the initial query input, during the time period in which the module 2525 is obtaining the suggestions from the database 1725, the non-personalized query suggestions obtained from databases 1735 and 1740 are presented to the person 102. In other words, instead of waiting to obtain the personalized query suggestions from the cache module 1730 to provide to the person 102 along with other non-personalized query suggestions, the non-personalized query suggestions are immediately presented to the person 102 where these suggestions are responsive to the initial query input. During this time period, the module 2525 works in the background to obtain and store the personalized query suggestions in the cache module 1730.

In one example, when the person 102 hits the first keystroke as the input, the cache module 1730 may return a miss in terms of the query suggestions. By the time the module 2525 has populated the cache module 1730 with query suggestions, the person 102 may have typed 1-2 additional characters in the search box, and when the person 102 types the next character, the cache module 1730 lookup will result in a positive hit, and personalized query suggestions will be returned. Therefore, although all query requests may be served with the latency computed as a sum of a traditional non-personalized query suggestion generation time and a cache lookup time, cache lookup may be done in parallel with non-personalized suggestion fetching by utilizing asynchronous operation by the module 2525 in the background. As a result, the time need for cache lookup may be completely free, causing virtually no latency increase from a traditional non-personalized query suggestion generation.

Figure 26:
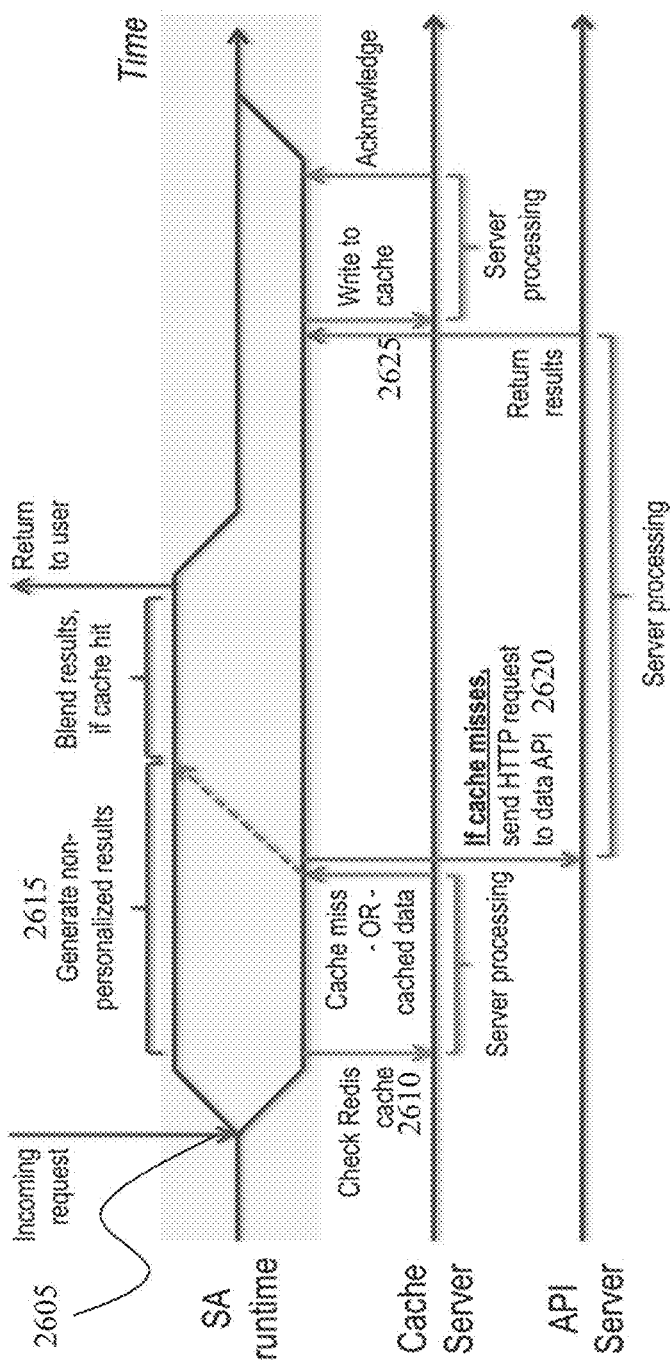
FIG. 26 illustrates an exemplary time series of an asynchronous operation involving processing of non-personalized as well as personalized query suggestions, according to an embodiment of the present teaching.

FIG. 26 illustrates an exemplary time series of the asynchronous operation discussed above. As shown, at the instance of receiving the query input 1742, at 2605, the search query suggestion system processes the cache server 1730 lookup and the request to person corpus database 1725 (2610) asynchronously and in parallel with the fetching of the non-personalized query suggestions (2615). In the scenario illustrated in the time series, cache lookup takes place completely in parallel with the fetching of the non-personalized query suggestions, thus adding no extra latency to responding to the query input. If cache module misses (2620), an HTTP request may be sent from the module 2525 to the database 1725. When the database 1725 returns the personalized data (2625), the search query suggestion system has already returned the non-personalized query suggestions back to the person 102 for that particular keystroke (that represents the initial query input). When the next keystroke (additional query input) takes place, the cache module 1730 lookup will hit, and personalized query suggestions will be blended with the non-personalized query suggestions and returned to the person 102.

In the context of this disclosure, a particular cache module/server 1730 may be selected based on the criteria that the candidate cache server has ultra-low latency (sub-millisecond) and is able to return a subset of stored data as a lookup result. This is important because, when per-user data size becomes very large, it may be inefficient to fetch whole person data from the cache server back to run-time for further processing, and it may limit scalability.

Figure 27:
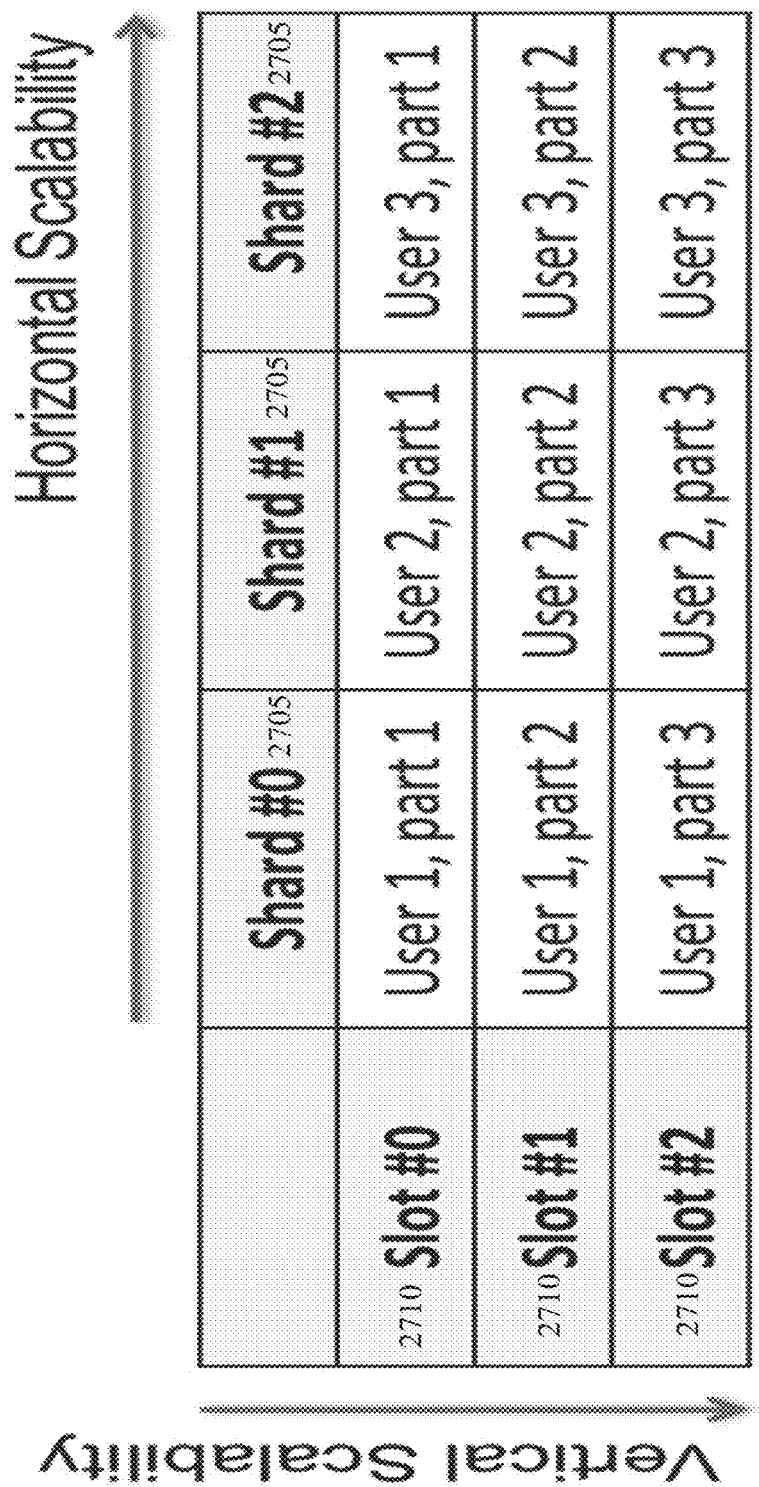
FIG. 27 illustrates the scalability of a caching system/module, according to an embodiment of the present teaching.

FIG. 27 illustrates the scalability of the caching system/module 1730 in both horizontal scalability and vertical scalability. In the context of the present disclosure, horizontal scalability is defined in terms of the scalability of the caching system when the number of users/persons 102 grows, and vertical scalability is defined in terms of the scalability of the caching system when per-person data size grows.

As illustrated in FIG. 27, in order to achieve horizontal scalability, persons 102 are partitioned into multiple "shards" 2705. The partitioning is done through a uniform hashing function on the unique ID assigned to each person. When the number of users/persons 102 grows, the number of shards 2705 is increased, and these shards 2705 are powered with added hardware capacity. In some embodiments, each server instance is capable of handling a fixed number of persons 102. Further, in order to achieve vertical scalability, each person 102's data is further partitioned into multiple "slots" 2710. Each slot 2710 includes a portion of the data, based on the hashing of each data entry's search key. In some embodiments, each slot 2710's data is handled by an independent server instance. Vertical scalability may be achieved through the following mechanisms:

(a) when looking up data for the person 102, M requests to M slots of the person 102's data are sent out in parallel. Each slot 2710 processes its own request in parallel, and each slot 2710 only needs to look up 1/M of data entries. Therefore, when the data size of the person 102 grows, the number of slots, M may be increased by adding more hardware capacity to ensure each slot 2710 handles a fixed number of entries during the lookup; and (b) when writing cache data for the person 102, the data are partitioned by slots 2710 at client side first, and each slot's data is sent to the server in parallel. Each slot 2710 only writes 1/M of the user's data, and as such, the total write time may be contained by adjusting the total number of slots 2710.

Figure 28:
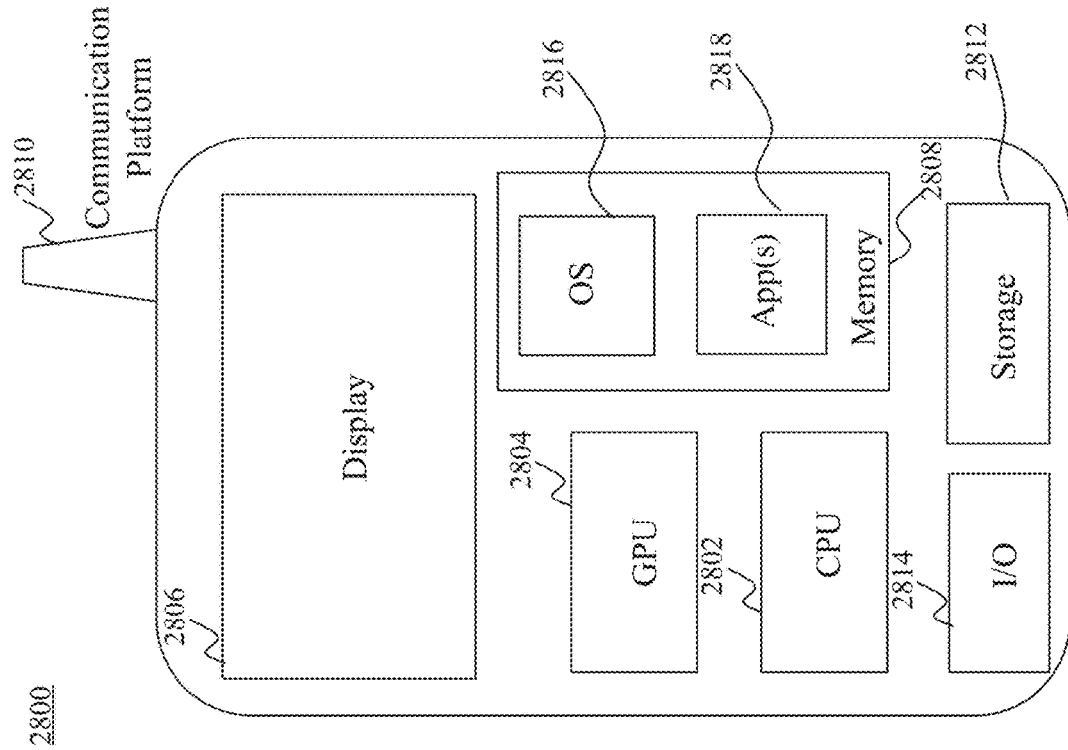
FIG. 28 depicts an architecture of a mobile device which can be used to implement a specialized query suggestion system incorporating teachings of the present disclosure.

FIG. 28 depicts the architecture of a mobile device, which can be used to realize a specialized system implementing the present teaching. In this example, the personal device on which content and query responses are presented and interacted with is a mobile device 2800, including, but not limited to, a smartphone, a tablet, a music player, a handheld gaming console, a global positioning system (GPS) receiver, a wearable computing device (e.g., eyeglasses, wrist watch, etc.), or any other form. The mobile device 2800 in this example includes one or more central processing units (CPUs) 2802, one or more graphic processing units (GPUs) 2804, a display 2806, memory 2808, a communication platform 2810, such as a wireless communication module, storage 2812, and one or more input/output (I/O) devices 2814. Any other suitable components, including, but not limited to, a system bus or a controller (not shown), may also be included in the mobile device 2800. As shown in FIG. 28, a mobile operating system 2816, e.g., iOS, Android, Windows Phone, etc., and one or more applications 2818 may be loaded into the memory 2808 from the storage 2812 in order to be executed by the CPU 2802. The applications 2818 may include a browser or any other suitable mobile apps for receiving and rendering content streams and advertisements on the mobile device 2800. Person interactions with the content streams, query responses, and advertisements may be achieved via the I/O devices 2814 and provided to the components of the query suggestion system, and generally, to the INDEX system 202.

To implement various modules, units, and their functionalities described in the present disclosure, computer hardware platforms may be used as the hardware platform(s) for one or more of the elements described above. The hardware elements, operating systems, and programming languages of such computers are conventional in nature, and it is presumed that those skilled in the art are adequately familiar therewith to adapt those technologies to infer a person's identity across different applications and devices and create and update a person profile based on such inference. A computer with person interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 29:
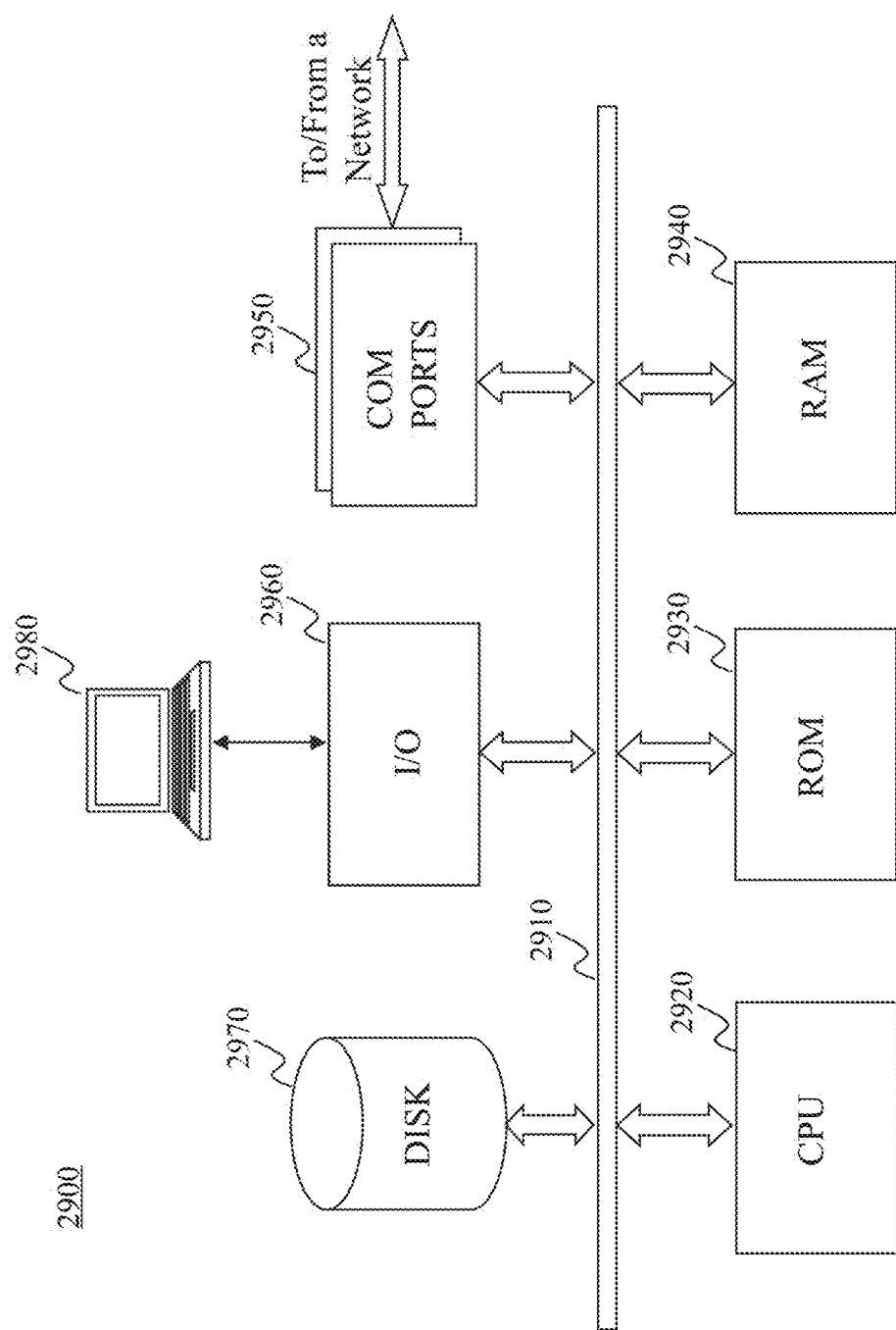
FIG. 29 depicts an architecture of a computer which can be used to implement a specialized query suggestion system incorporating teachings of the present disclosure.

FIG. 29 depicts the architecture of a computing device which can be used to realize a specialized system implementing the present teaching. Such a specialized system incorporating the present teaching has a functional block diagram illustration of a hardware platform that includes person interface elements. The computer may be a general-purpose computer or a special purpose computer. Both can be used to implement a specialized system for the present teaching. This computer 2900 may be used to implement any component of person profile creation and updating techniques, as described herein. For example, suggestion generation engine 1705, suggestion ranking module 1710, etc., may be implemented on a computer such as computer 2900, via its hardware, software program, firmware, or a combination thereof. Although only one such computer is shown, for convenience, the computer functions relating to providing query suggestions as described herein may be implemented in a distributed fashion on a number of similar platforms, to distribute the processing load.

The computer 2900, for example, includes COM ports (or one or more communication platforms) 2950 connected to and from a network connected thereto to facilitate data communications. Computer 2900 also includes a central processing unit (CPU) 2920, in the form of one or more processors, for executing program instructions. The exemplary computer platform includes an internal communication bus 2910, program storage and data storage of different forms, e.g., disk 2970, read only memory (ROM) 2930, or random access memory (RAM) 2940, for various data files to be processed and/or communicated by the computer, as well as possibly program instructions to be executed by the CPU. Computer 2900 also includes an I/O component 2960, supporting input/output flows between the computer and other components therein such as person interface elements 2980. Computer 2900 may also receive programming and data via network communications.

Hence, aspects of the methods of providing query suggestions and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other person profile and app management server into the hardware platform(s) of a computing environment or other system implementing a computing environment or similar functionalities in connection with person profile creation and updating techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques of generating and providing query suggestions described herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for query suggestion, the method comprising:
   generating a person corpus based on data cross linked from a plurality of data sources some of which are private to the person, wherein the data is cross-linked based on cross-linking keys identified from the data;
   receiving a first portion of an input from a person;
   obtaining, with respect to the first portion of the input, a first set of query suggestions based on the person corpus;

receiving, subsequent to the first portion of the input, a second portion of the input from the person;
obtaining, with respect to the first and second portions of the input, a second set of query suggestions from the person corpus, wherein the obtaining includes:
determining, for each query suggestion of the first set and the second set of query suggestions, a type of data source from which the query suggestion is obtained, and
determining, based on the type of data source, an information extraction model to be applied to the data source to obtain the query suggestion; and
presenting at least some of the first set and second set of query suggestions.

2. The method of claim 1, wherein the at least one data source private to the person includes:
private electronic mails;
a private calendar;
a private contact list;
private messages;
private bookmarks;
private visual information;
private voice information; and
private log information.

3. The method of claim 1, further comprising:
obtaining at least one query suggestion generated based on information from an additional data source; and
presenting the at least one query suggestion.

4. The method of claim 3, wherein the additional data source includes:
a person search history; and
an archive of regular suggestions.

5. The method of claim 1, wherein the first portion of the input corresponds to a prefix of a search query.

6. A system having at least one processor, storage, and a communication platform, to provide query suggestion, the system comprising:
a person-centric system implemented using the at least one processor and configured for generating a person corpus based on data cross linked from a plurality of data sources some of which are private to the person, wherein the data is cross-linked based on cross-linking keys identified from the data;
a request processing unit implemented using the at least one processor and configured to receive a first portion of an input from a person;
a first suggestion retrieving module implemented using the at least one processor and configured to
obtain, with respect to the first portion of the input, a first set of query suggestions based on the person corpus,
obtain, with respect to the first portion of the input and a second portion of the input that is received subsequent to the first portion, a second set of query suggestions from the person corpus, wherein the first suggestion retrieval module is further configured to:
determine, for each query suggestion of the first set and the second set of query suggestions, a type of data source from which the query suggestion is obtained, and
determine, based on the type of data source, an information extraction model to be applied to the data source to obtain the query suggestion; and
a query suggestion generation module implemented using the at least one processor and configured to provide at least some of the first set and second set of query suggestions.

7. The system of claim 6, wherein the at least one data source private to the person includes:
private electronic mails;
a private calendar;
a private contact list;
private messages;
private bookmarks;
private visual information;
private voice information; and
private log information.

8. The system of claim 6, further comprising:
a second suggestion retrieving module implemented using the at least one processor and configured to obtain at least one query suggestion generated based on information from an additional data source,
wherein the query suggestion generation module is further configured to present the at least one query suggestion.

9. The system of claim 8, wherein the additional data source includes:
a person search history; and
an archive of regular suggestions.

10. The system of claim 6, wherein the first portion of the input corresponds to a prefix of a search query.

11. A non-transitory machine-readable medium having information recorded thereon to provide query suggestions, wherein the information, when read by the machine, causes the machine to perform operations comprising:
generating a person corpus based on data cross linked from a plurality of data sources some of which are private to the person, wherein the data is cross-linked based on cross-linking keys identified from the data;
receiving a first portion of an input from a person;
obtaining, with respect to the first portion of the input, a first set of query suggestions based on the person corpus;
receiving, subsequent to the first portion of the input, a second portion of the input from the person;
obtaining, with respect to the first and second portions of the input, a second set of query suggestions from the person corpus, wherein the obtaining includes:
determining, for each query suggestion of the first set and the second set of query suggestions, a type of data source from which the query suggestion is obtained, and
determining, based on the type of data source, an information extraction model to be applied to the data source to obtain the query suggestion; and
presenting at least some of the first set and second set of query suggestions.

12. The medium of claim 11, wherein the at least one data source private to the person includes:
private electronic mails;
a private calendar;
a private contact list;
private messages;
private bookmarks;
private visual information;
private voice information; and
private log information.

13. The medium of claim 11, further comprising:
obtaining at least one query suggestion generated based on information from an additional data source; and
presenting the at least one query suggestion.

14. The medium of claim 13, wherein the additional data source includes:
a person search history; and
an archive of regular suggestions.

15. The medium of claim 11, wherein the first portion of the input corresponds to a prefix of a search query.

16. The method of claim 1, wherein the one or more query suggestions are presented to the person simultaneously.

17. The method of claim 3, wherein the at least one query suggestion generated based on information from an additional data source is presented replacing the at least some query suggestions.

18. The system of claim 8, wherein the at least one query suggestion generated based on information from an additional data source is presented replacing the at least some query suggestions.

19. The medium of claim 13, wherein the at least one query suggestion generated based on information from an additional data source is presented replacing the at least some query suggestions.

20. The method of claim 1, further comprising:
   determining an order of presenting the first set and second set of query suggestions based on at least one of a first criterion associated with the at least one data source from which the query is obtained, and a second criterion associated with metadata related to the input.

21. The method of claim 1, wherein each query suggestion of the first set and second set of query suggestions is mapped to a common feature space based on at least one attribute associated with the query suggestion.

22. The method of claim 1, wherein the person corpus is generated automatically without any input from the user.

* * * * *